US012656540B2

(12) United States Patent
DeCorby

(10) Patent No.: US 12,656,540 B2
(45) Date of Patent: Jun. 16, 2026

(54) OPTICAL BANDPASS FILTER

(71) Applicant: The Governors of the University of Alberta, Edmonton (CA)

(72) Inventor: Ray DeCorby, Edmonton (CA)

(73) Assignee: The Governors of the University of Alberta, Edmonton (CA)

( * ) Notice: Subject to any disclaimer, the term of this patent is extended or adjusted under 35 U.S.C. 154(b) by 842 days.

(21) Appl. No.: 17/602,743

(22) PCT Filed: Apr. 12, 2020

(86) PCT No.: PCT/IB2020/053461

§ 371 (c)(1),
(2) Date: Oct. 8, 2021

(87) PCT Pub. No.: WO2020/208610

PCT Pub. Date: Oct. 15, 2020

(65) Prior Publication Data

US 2022/0196897 A1     Jun. 23, 2022

Related U.S. Application Data

(60) Provisional application No. 62/832,612, filed on Apr. 11, 2019.

(51) Int. Cl.
G02B 5/28          (2006.01)
G02B 26/00          (2006.01)
G02B 27/30          (2006.01)

(52) U.S. Cl.
CPC ........... G02B 5/288 (2013.01); G02B 26/001 (2013.01); G02B 27/30 (2013.01)

(58) Field of Classification Search
CPC ...... G02B 5/288; G02B 26/001; G02B 27/30; G02B 6/29395; H04B 1/0057; H03H 7/12; H03H 7/0161; H03H 11/1291
See application file for complete search history.

(56) References Cited

U.S. PATENT DOCUMENTS 5,121,181 A       6/1992   Smith et al.
5,267,077 A  *  11/1993   Blonder ............... G02B 6/2938
                                                            385/11

(Continued)

FOREIGN PATENT DOCUMENTS

CA          2960643  A1  *   9/2017
CN          1215353   C       8/2005

OTHER PUBLICATIONS

International search report and Written opinion of International Search Authority, PCT/IB2020/053461, Aug. 18, 2020.

(Continued)

*Primary Examiner* — Matthew Y Lee

(74) *Attorney, Agent, or Firm* — CHRISTENSEN O'CONNOR JOHNSON KINDNESS PLLC

(57)                    ABSTRACT

A tunable resonant tunneling gap for resonant tunneling across the tunneling gap. By adjusting the width of the tunneling gap and adjusting an angle of incidence of light onto the tunneling gap, a pass-band shape and center wavelength may be tuned. The tunneling gap may be an air gap between lenses coated with matching Bragg reflectors. The air gap may be adjusted for example using piezo actuators connecting between the lenses. The angle of incidence may be adjusted for example by rotating the lenses, and thus the tunneling gap, relative to an incident beam of light.

14 Claims, 18 Drawing Sheets

(56)                References Cited

U.S. PATENT DOCUMENTS

| | | | |
|---|---|---|---|
| 5,361,155 A * | 11/1994 | Chiaroni | G02B 6/29358 |
| | | | 398/144 |
| 5,912,762 A | 6/1999 | Li et al. | |
| 6,031,653 A * | 2/2000 | Wang | G02B 26/02 |
| | | | 359/291 |
| 6,377,383 B1 | 4/2002 | Whitehead et al. | |
| 8,977,082 B2 | 3/2015 | Singh et al. | |
| 8,977,086 B2 | 3/2015 | Decorby | |
| 9,274,330 B2 * | 3/2016 | Klinghult | G02B 26/007 |
| 9,304,237 B1 * | 4/2016 | Wang | G02B 26/007 |
| 2003/0020926 A1 * | 1/2003 | Miron | G01J 3/26 |
| | | | 356/519 |
| 2003/0173504 A1 * | 9/2003 | Cole | G01J 3/36 |
| | | | 257/E31.115 |
| 2004/0258107 A1 * | 12/2004 | Sherrer | H01S 5/141 |
| | | | 372/19 |
| 2006/0098283 A1 | 5/2006 | Sato | |
| 2011/0176768 A1 * | 7/2011 | Singh | G02B 5/285 |
| | | | 385/36 |
| 2013/0188254 A1 * | 7/2013 | Li | G02B 27/283 |
| | | | 156/60 |

OTHER PUBLICATIONS

Melnyk et al, An Air Gap Resonant Tunneling Band-Pass Filter and Polarizer, Optics Letters, vol. 41, No. 8, Apr. 15, 2016.
Brand et al, Evanescently coupled interface states in the gap between two Bragg reflectors, Optical Society of America, vol. 35, No. 12, Jun. 15, 2010.
Li et al, Optical coatings with an integral FTIR air layer, Optical Society of America, vol. 18, No. 4, Feb. 15, 2010.
Baumeister (see P.W. Baumeister, "Optical tunneling and its application to optical filters," Appl. Opt. 6, 897-905 (1967).
A. Q. Jian and X. M. Zhang, "Resonant optical tunneling effect: recent progress in modeling and applications," IEEE J. Sel. Top. Quant. Electron. 19, 9000310 (2013).
T. R. Harrison et al., "Widely tunable bandpass filter based on resonant optical tunneling," Opt. Express 23633-23644 (2019).

* cited by examiner piezo — 220

230

228

208

204

228

212

230

226

224 piezo

222

220

228

208

224

222

OPTICAL BANDPASS FILTER

TECHNICAL FIELD

Optical bandpass filters.

BACKGROUND

Widely tunable optical filters have many potential applications in optics and photonics, including for communication systems, for hyperspectral imaging systems, for fluorescence and Raman spectroscopy, and for radiometry and photometry. Pass-band isolation has often been achieved using diffraction-grating-based monochromators, which can provide broad tuning range, flexibility with respect to pass-bandwidth, and potentially high out-of-band blocking (particularly for double-grating instruments). However, they also introduce significant loss that scales in a nonlinear way with the resolving power, and typically do not preserve the wavefront of the input signal. Many important applications require tunable filters with wavefront-preserving properties. For example, the emergence of fiber-based supercontinuum sources has created a need for filters that are tunable over the visible-to-near-infrared (~400-2500 nm wavelength) region, and which preserve the Gaussian beam profile of the source. As another example, tunable-filter-based hyper-spectral imaging systems (so-called 'staring' systems) are widely sought for applications in both the visible and near-infrared (NIR) ranges. These applications are often addressed using acousto-optic or liquid-crystal tunable filters, both of which suffer from high in-band loss and poor out-of-band blocking. Nevertheless, these devices are widely used and cost typically >>$10 k for a unit with several hundred nanometers of wavelength tunability.

Volume Bragg gratings, a diffraction-based device with wavefront-preserving capabilities, are used in some other commercial devices, typically costing >>$50 k for a single unit. Instruments based on VBGs can provide low polarization dependence and loss, as well as high out-of-band rejection, but usually incorporate two or more gratings along with supplementary optics (retro-reflectors, collimation lenses), and are relatively complex and costly.

Thin-film Fabry-Perot filters can address some of the limitations of existing instruments. Advances in computer-based design and deposition processes have increased their performance and enabled new options for bandpass tuning by linear or angular translation. In order to achieve an extended tuning and out-of-band blocking range, these filters typically employ hundreds of layers. Single-part linearly variable filters (LVF) can be tuned over a large range (e.g. ~400-900 nm) but through relatively slow translation of a large piece. Angle-tuned filters can be tuned more rapidly, but are more limited in tuning range, such that several individual filters must be combined for broadband applications.

The Volume Bragg Grating (VBG) based tunable filters are widely employed by users of supercontinuum laser sources. Embodiments of the devices disclosed in this document would have similar applications, but could likely access a much wider market due to reduced cost.

Filters with improvements in one or more qualities, such as cost, out-of-band blocking, range of wavelengths, or passband characteristics, are desired.

A previously filed CA patent application, "Optical bandpass filter, polarizer, and multiplexer", CA Pat App. number 2,960,643 filed Mar. 8, 2017 and published Sep. 8, 2017, discloses technology to which the disclosures of this document may be implemented as improvements.

SUMMARY

There is provided an optical bandpass filter based on resonant optical tunneling. It may be widely tunable over a wide range of wavelength, while strongly rejecting signals outside the passband.

The resonant tunneling may be provided by tunneling across an air gap between thin film stacks. The term "air gap" need not necessarily refer to a gap filled with air. It can refer to any adjustable thickness layer across which resonant tunneling may occur. "Tunneling gap" refers to a layer across which tunneling may occur.

The use of an air gap tunneling layer enables convenient substrates and incident angles, and the strategy of employing high-index-contrast matching stacks results in a strong rejection of one polarization state—i.e. the filter simultaneously plays the role of a polarizer, rather than exhibiting polarization-dependent passbands. Furthermore, by building in a tunable tunneling layer, the need for extreme control over thin film thicknesses is removed. Moreover, this tunable air gap allows us to turn angular dependence into an advantage, enabling passband tuning, depending on the embodiment, over a very large wavelength range.

Tuning of an incidence angle may be combined with tuning of the air gap tunneling layer thickness, for example using piezos. In an embodiment, this may enable the position of a flat-top pass-band, with fractional bandwidth $\Delta\lambda/\lambda$~0.5%, to be varied over an extremely broad range (~1000-1800 nm wavelength), using a single optical prism assembly.

The pass-band may be tuned for example through simultaneous control over the incidence angle and the spacing between e.g. two coated hemi-cylindrical or hemispherical prisms.

A fully functional and automated bench-top instrument has been built using hemi-cylindrical lenses. Results show excellent agreement with theoretical predictions. The embodiment with hemispherical lenses has been shown to work by ray tracing and other simulations. Rotational symmetry of the lenses is useful to avoid deviating the beam as the lens is rotated, but is not strictly required.

The terms "light" and "optical" are not restricted to any particular range of wavelengths of light, and include any wavelength of electromagnetic radiation for which a resonant tunneling filter based on frustrated total internal reflection may be produced. Systems operating in different wavelength regions (e.g. the visible band) can be realized through the use of appropriate transparent materials for the matching stacks.

It is expected that the thin film stacks on each side of the airgap will in most cased be made nominally identical to each other, but the stacks could be different provided they overall satisfy the criteria outlined in the detailed description.

The angle of incidence of light primarily determines the passband center position, while the air gap is varied to adjust the bandwidth and the shape, the airgap required to obtain a given shape depending on the angle of incidence.

In an embodiment, the spectral position of the passband of a resonant tunneling optical filter may be tuned through simultaneous control of the incidence angle and the thickness of an air gap tunneling layer. A flat-top bandpass response may be obtained centered at any arbitrary frequency/wavelength within a wide spectral range, using the resonant tunneling optical filter. In an example, the angle of incidence may be selected to provide a desired center wavelength of the passband, and the tunneling gap may be selected to provide a desired shape of the passband.

An optical assembly using these principles may be based on the use of two hemi-cylindrical lenses as input/output coupling prisms, where in an example the flat faces of each lens are coated with a nominally identical and spatially uniform admittance matching thin film stacks, and which are assembled such that a small air gap is formed between their adjacent flat faces, and where this air gap acts as an optical tunneling layer whose thickness can be varied by controlling the spacing between the two lenses. The optical assembly may also be implemented, for example, with the hemi-cylindrical lenses replaced by hemi-spherical (half-ball) lenses.

A tunneling filter system is disclosed in which the optical assembly is mounted on a rotational stage, such that the optical assembly can be rotated around an axis without deviating the path of a beam which is made to tunnel through the air gap of the optical assembly. In the tunneling filter system, supplementary lenses may be used to ensure that a well-collimated beam is incident on the air gap of the optical assembly. Where the optical assembly comprises hemi-spherical lenses, these lenses may also play the role of collimating and/or focusing lenses.

Filters implemented using half-ball lenses as coupling prisms can function as extremely compact fiber- or aperture-coupled spectrometers, or as the tunable filter in a compact hyperspectral imaging assembly.

These and other aspects of the device and method are set out in the claims.

BRIEF DESCRIPTION OF THE FIGURES

Embodiments will now be described with reference to the figures, in which like reference characters denote like elements, by way of example, and in which.

4

Figure 7A:
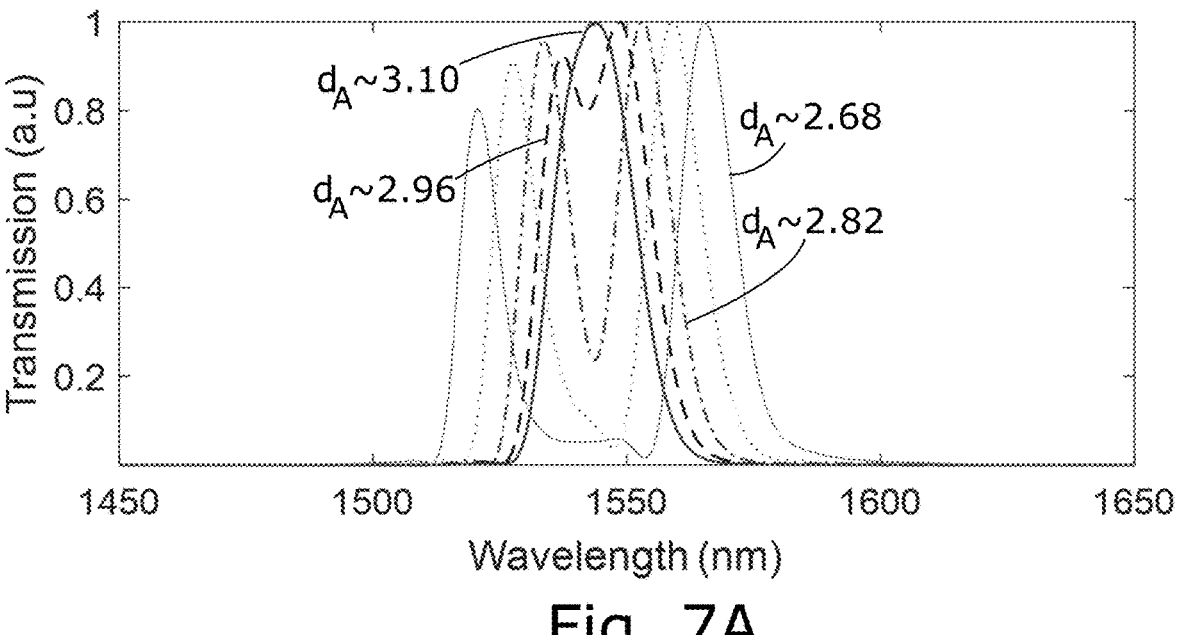

FIG. 7A is a graph showing an experimental passband feature centered near 1550 nm wavelength for an incident angle ~46 degrees and various values of the air-gap thickness.

Figure 7B:
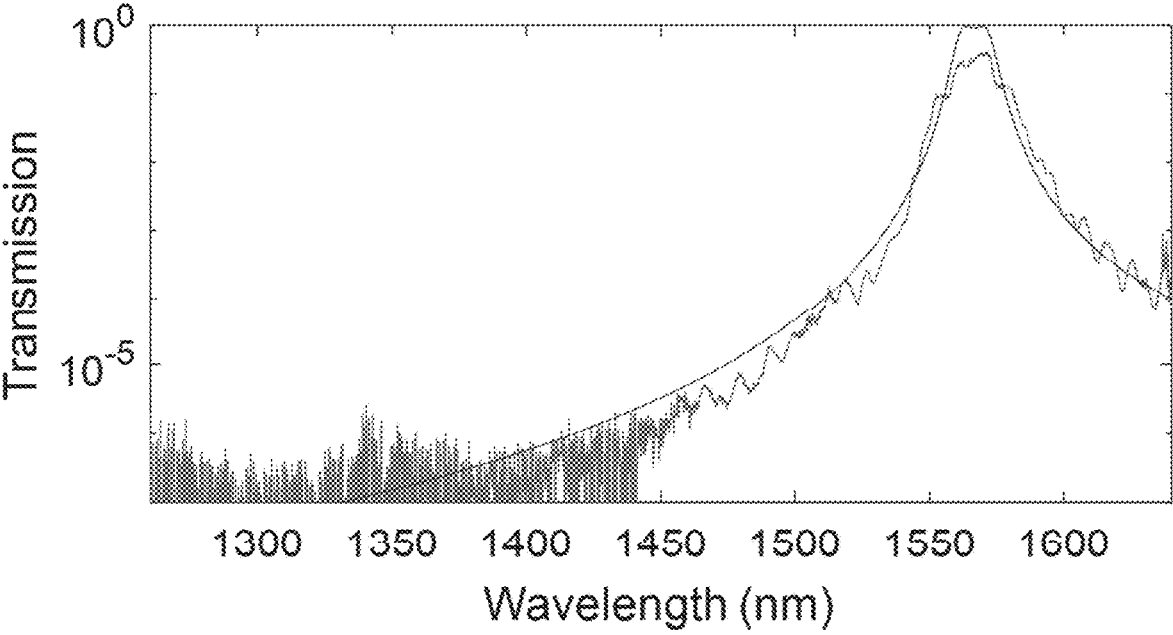

FIG. 7B is a graph showing a passband feature similar to the feature shown for the solid curve ($d_A$~3.10) in FIG. 7A, but on a logarithmic scale.

Figure 8A:
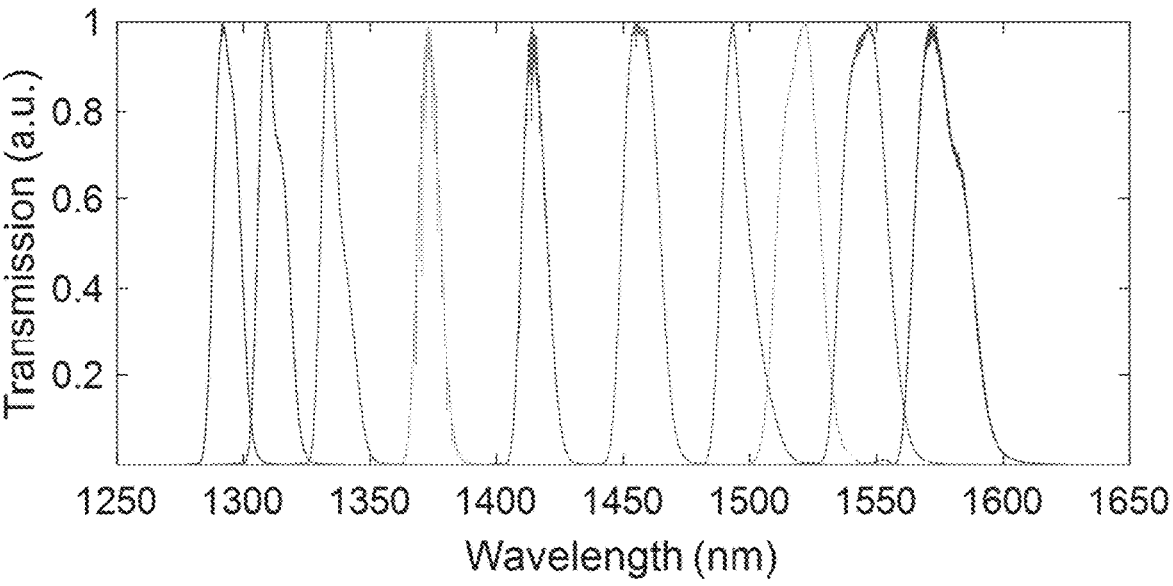

FIG. 8A is a graph showing experimental passbands centered at various wavelengths in the ~1300-1600 nm wavelength range.

Figure 8B:
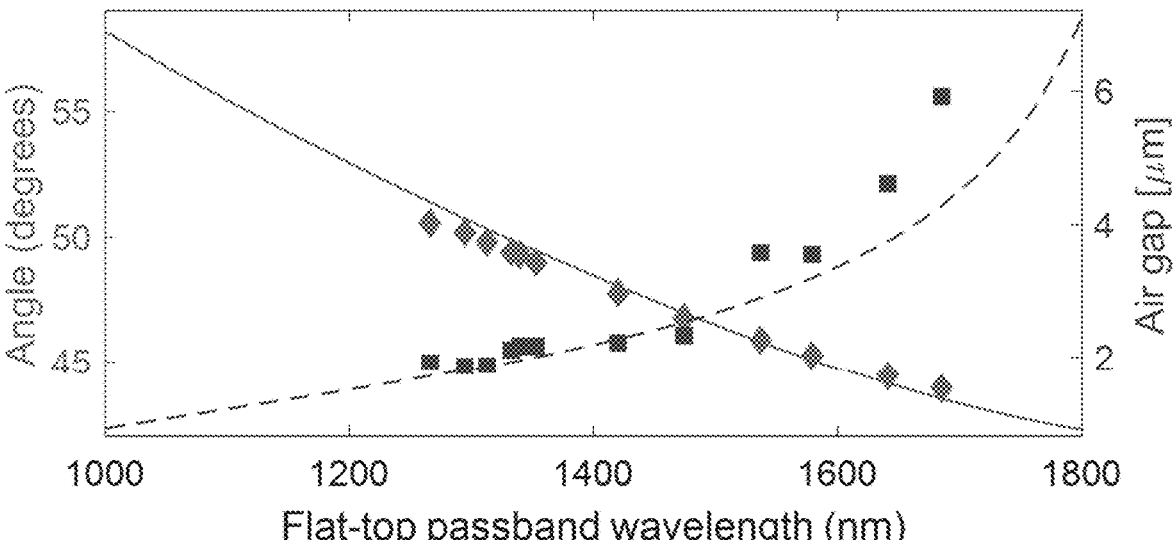

FIG. 8B is a graph showing a comparison between theoretical and experimental combinations of air gap thickness and incident angle required to observe a flat-top passband versus wavelength.

Figure 9:
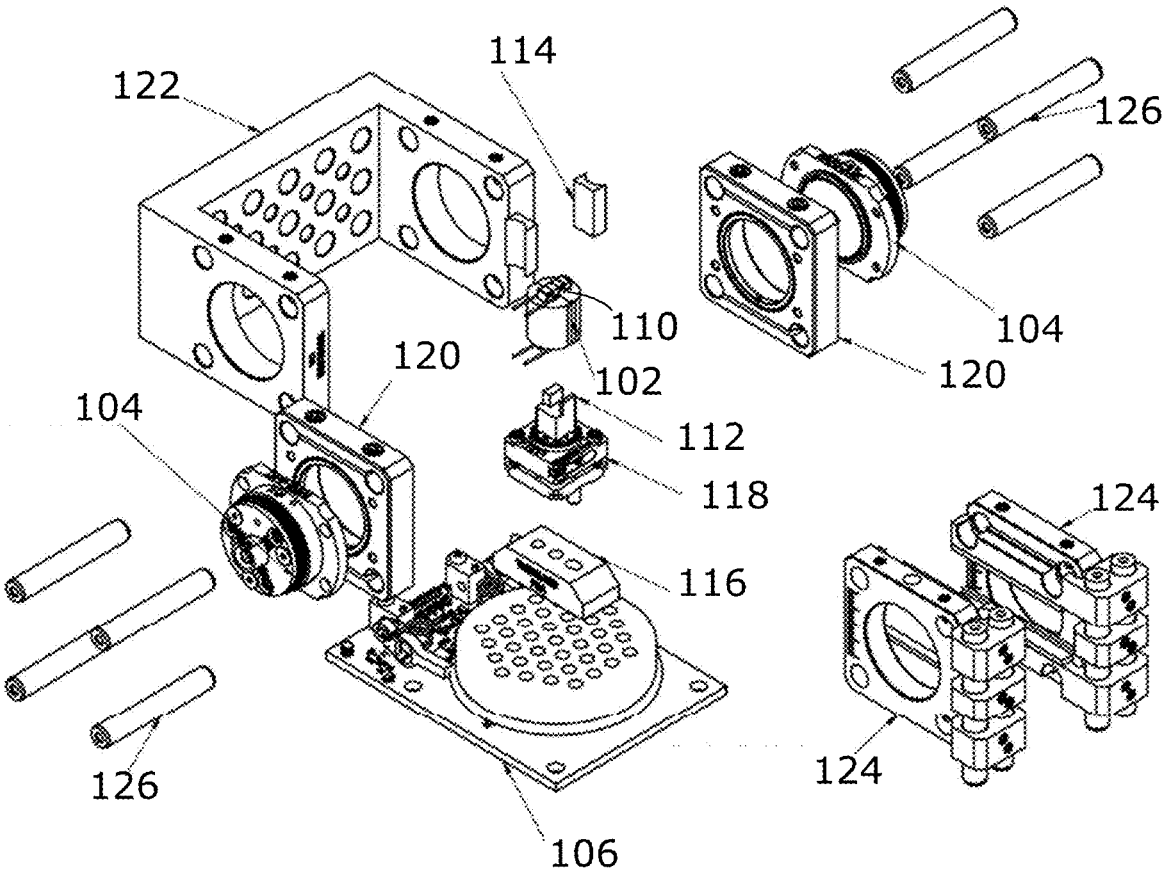

FIG. 9 is an exploded schematic drawing of a prototype tunable filter.

Figure 10A:
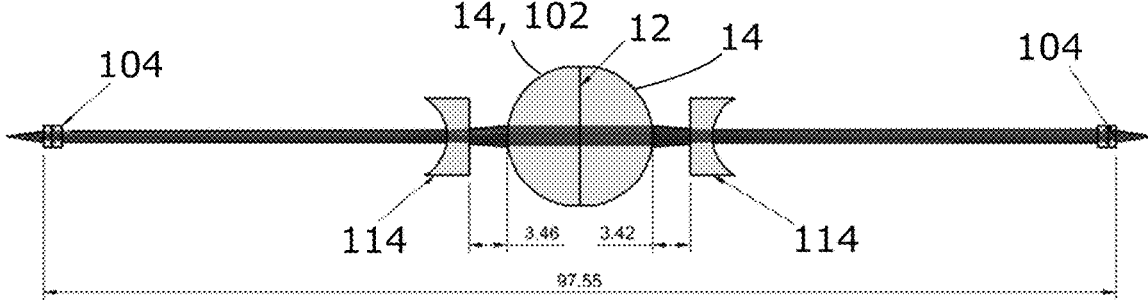

FIG. 10A is a top view of a schematic layout showing the results of a ray tracing simulation.

Figure 10B:
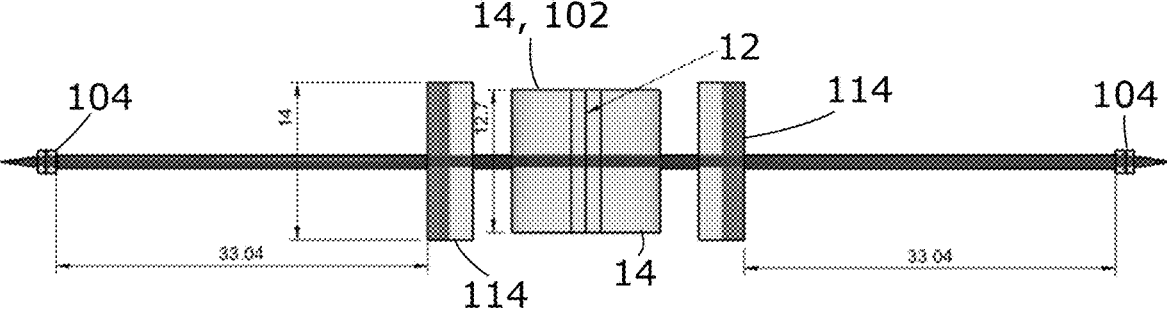

FIG. 10B is a side view of the schematic layout of FIG. 10A showing the results of the ray tracing simulation.

Figures 11A, 11B:
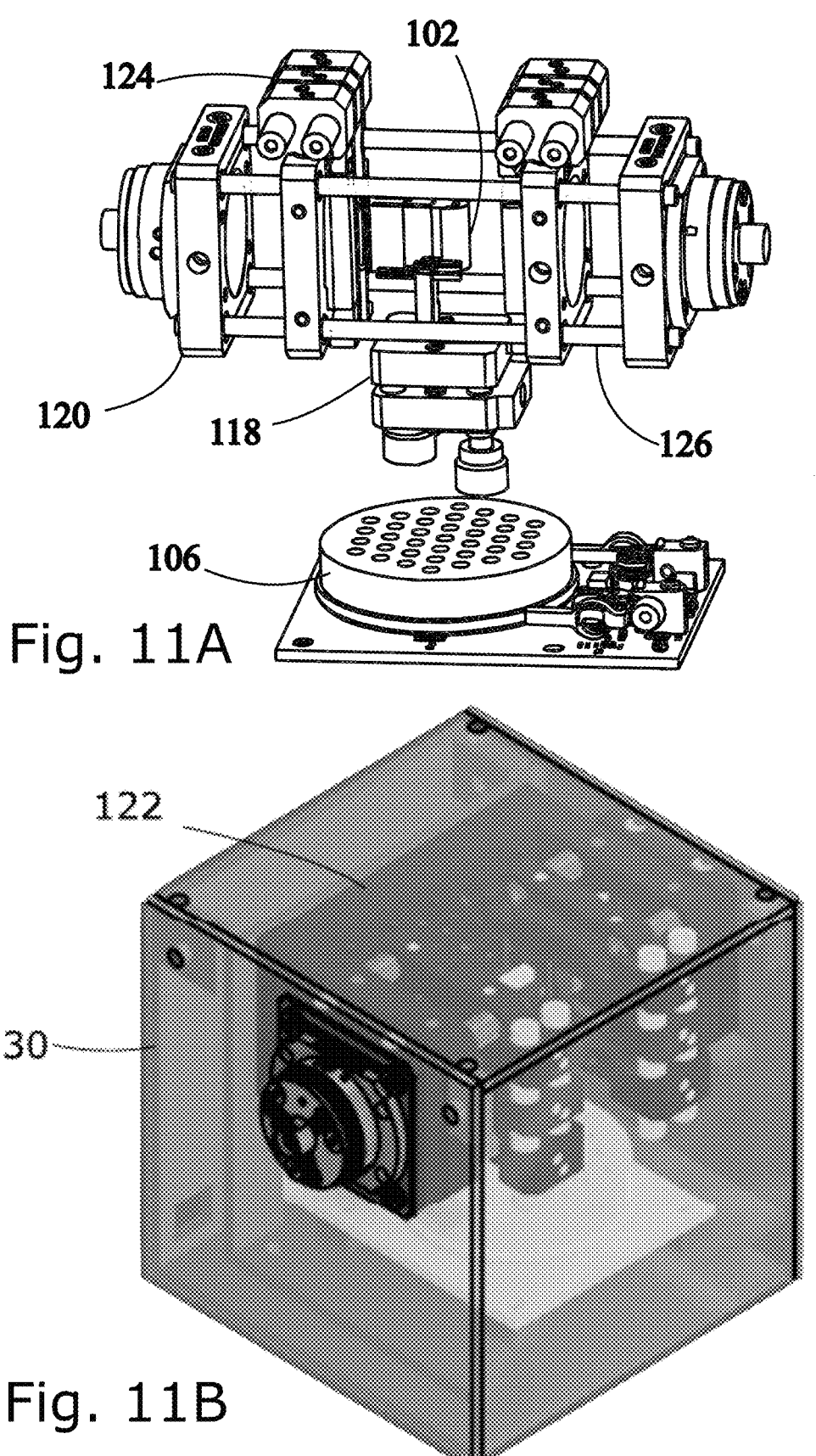

FIG. 11A is a rendering of an optical system of the tunable filter of FIG. 9.

FIG. 11B is a rendering of the tunable filter of FIG. 9.

Figure 12A:
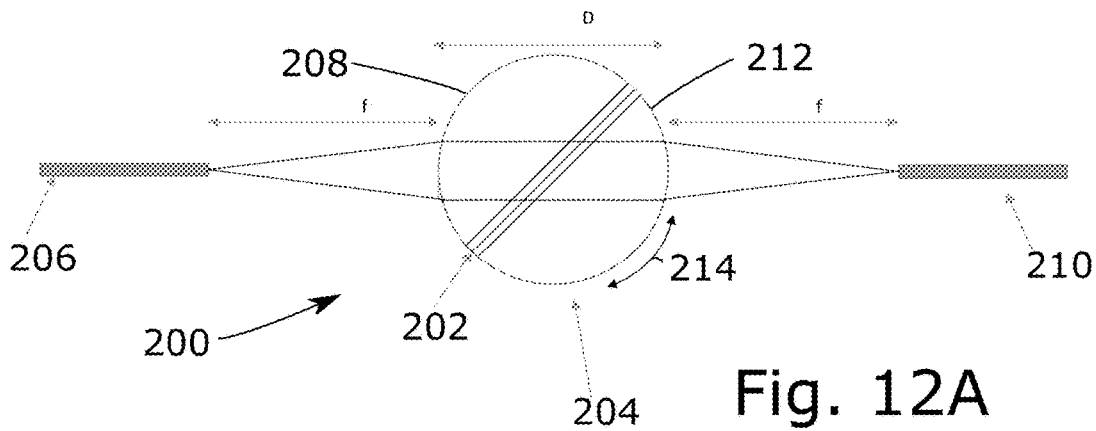

FIG. 12A is a schematic diagram of a tunable filter based on resonant tunneling through an air gap between two thin-film-stack-terminated half-ball lenses forming a prism assembly.

Figure 12B:
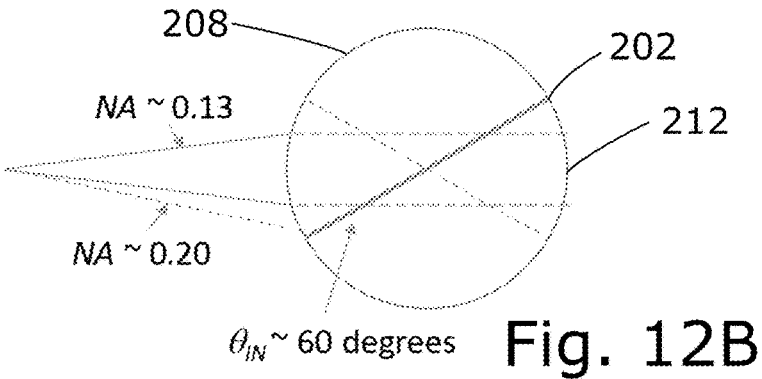

FIG. 12B is a schematic diagram showing an assessment of the acceptance angle, for the limiting case with $\theta_{IN}$ near its maximum required value, for the tunable filter of FIG. 12A.

Figure 12C:
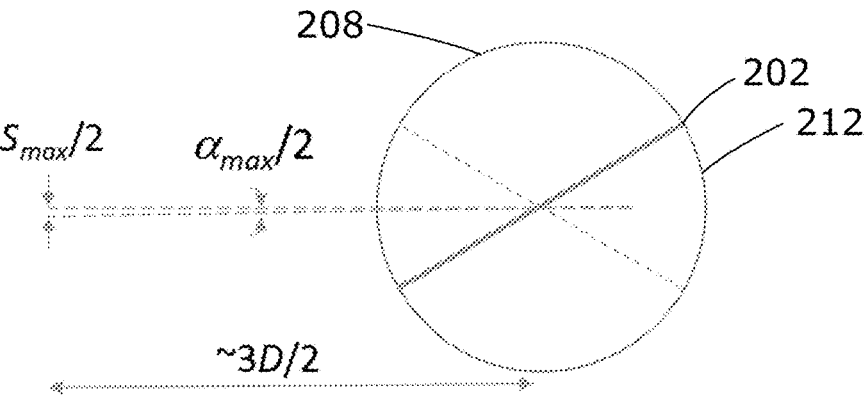

FIG. 12C is a schematic diagram showing an assessment of the maximum input aperture size for the tunable filter of FIG. 12A.

Figures 13A, 13B:
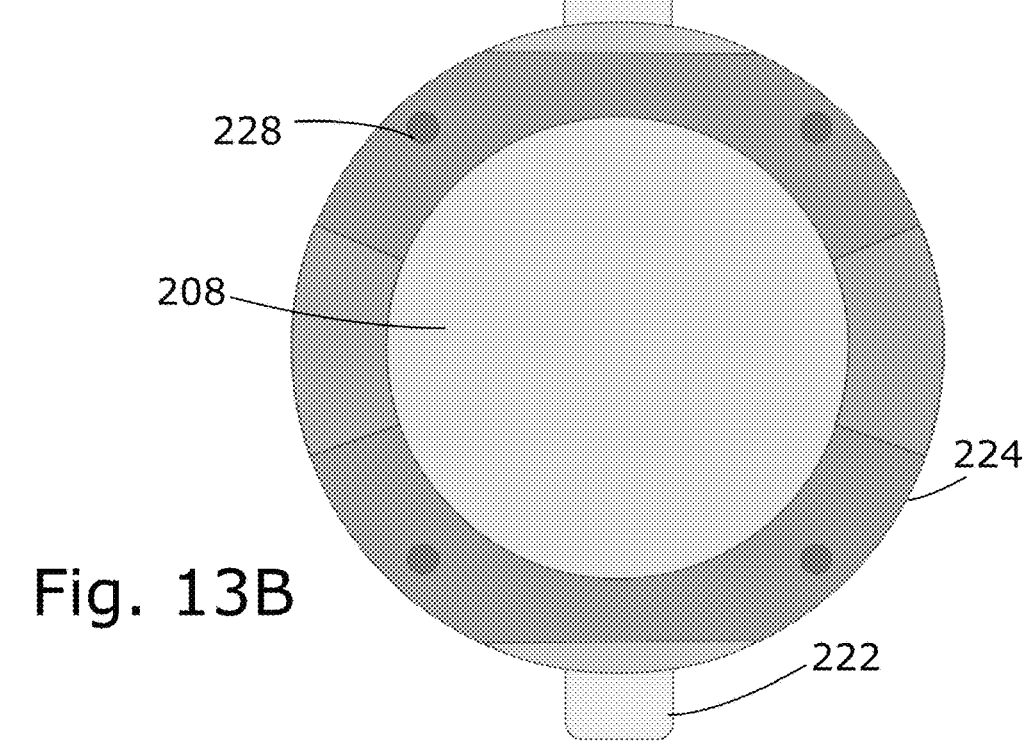

FIG. 13A is a side view is a schematic side view of a prism assembly of FIG. 12A with piezo actuators attached using piezo holders.

FIG. 13B is a schematic end view of the prism assembly of FIG. 13A.

Figure 14:
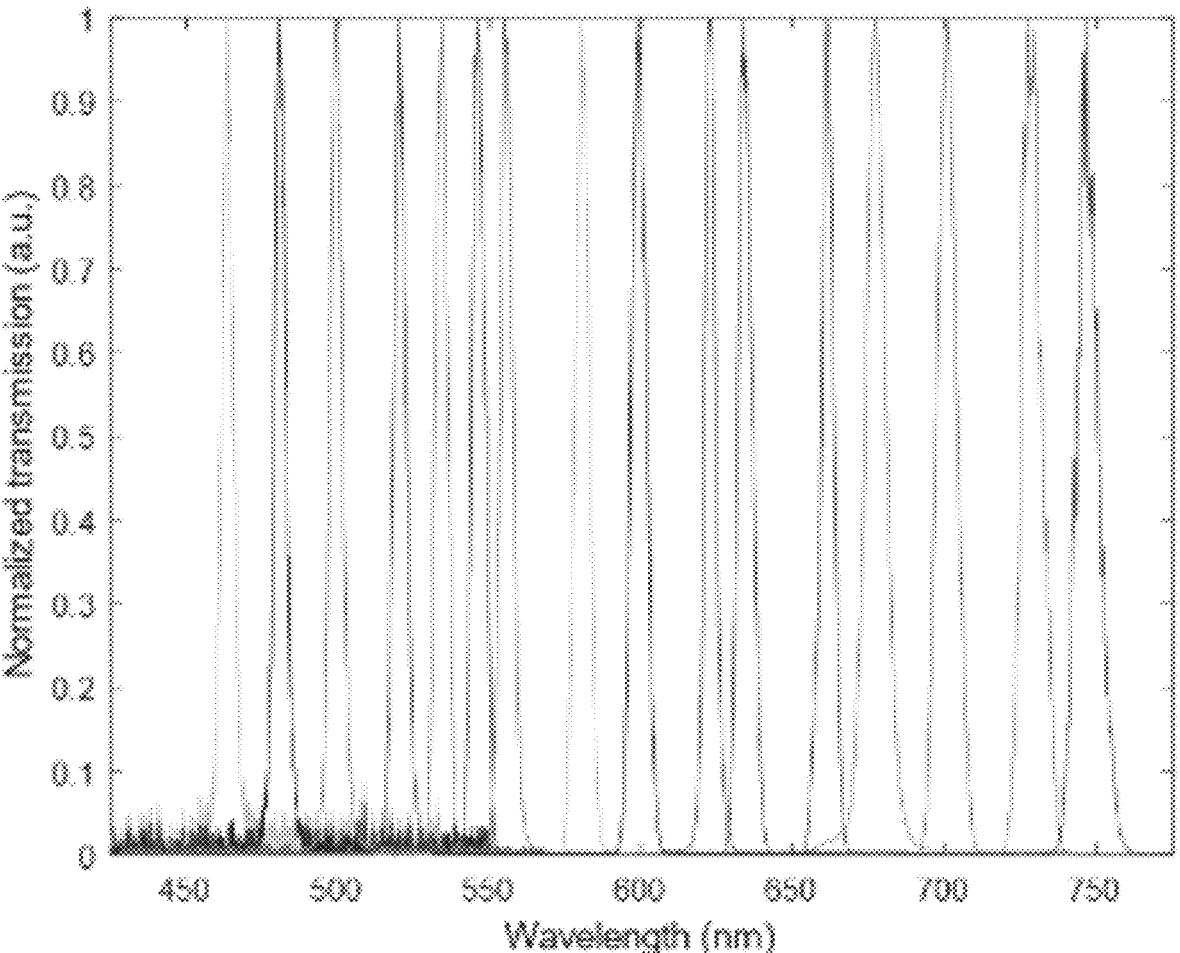

FIG. 14 is a graph showing experimental passbands centered at various wavelengths in the wavelength ranges of 460-750 nm, produced by an 8-layer $Ta_2O_5/SiO_2$ structure.

Figure 15A:
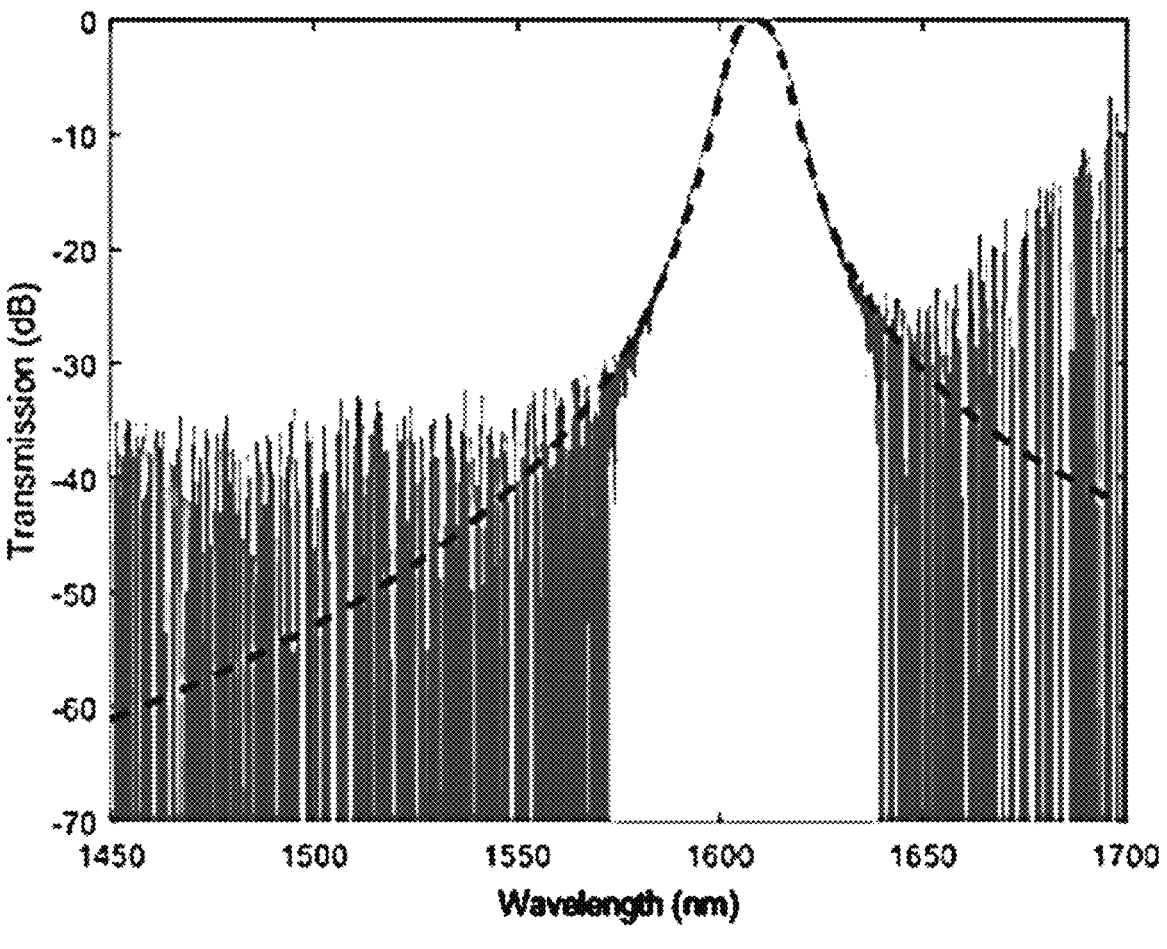

FIG. 15A is a graph showing typical passband features on a logarithmic scale for a a-Si/SiO2 structure at ~1610 nm.

Figure 15B:
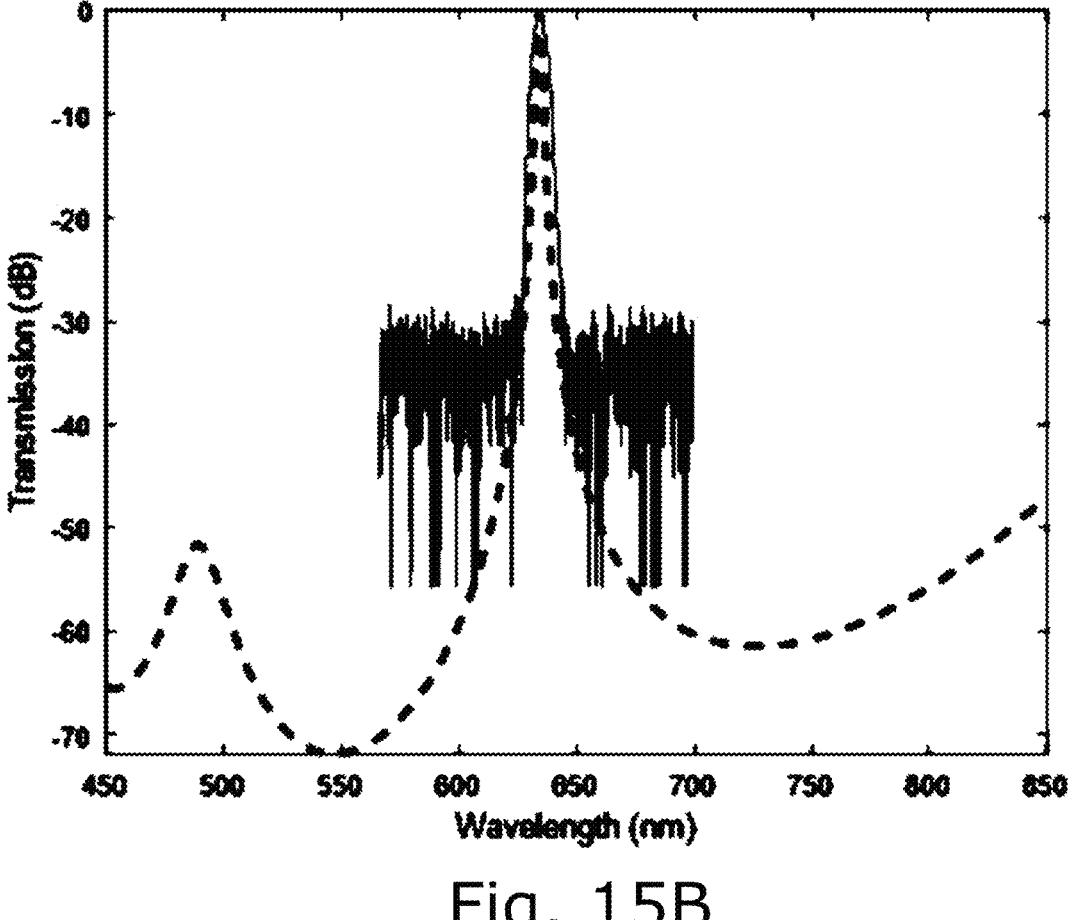

FIG. 15B is a graph showing typical passband features on a logarithmic scale of the Ta2O5/SiO2 structure of FIG. 14 at ~633 nm.

Figure 15C:
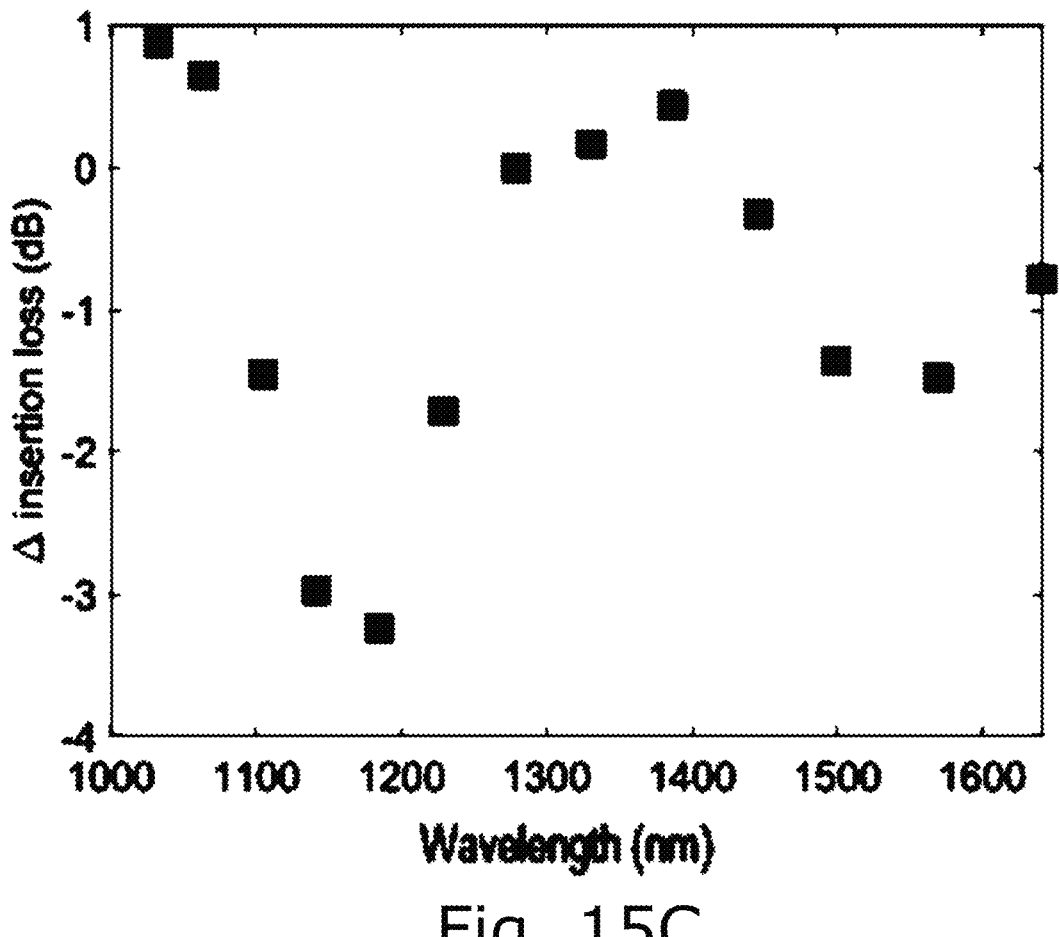

FIG. 15C is a plot showing a change in insertion loss through angle and piezo tuning of the passband center wavelength for the structure of FIG. 15A.

Figure 16A:
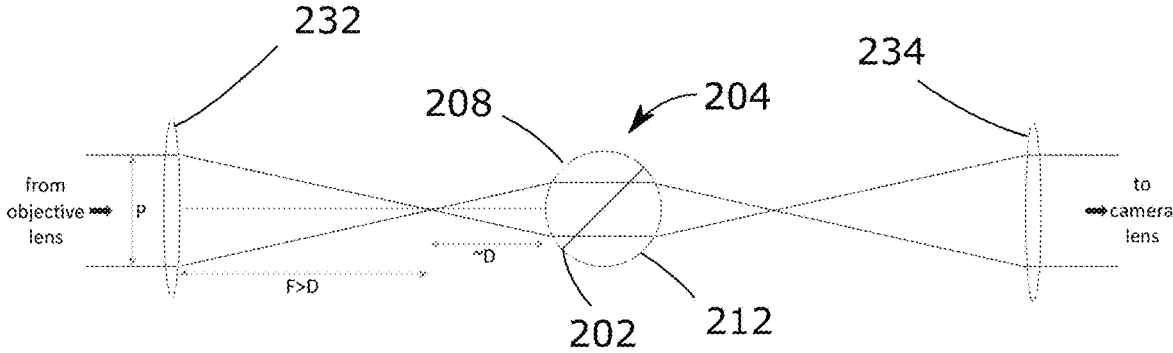

FIG. 16A is a schematic illustration showing the incorporation of a ball lens tunneling filter into an imaging system.

Figure 16B:
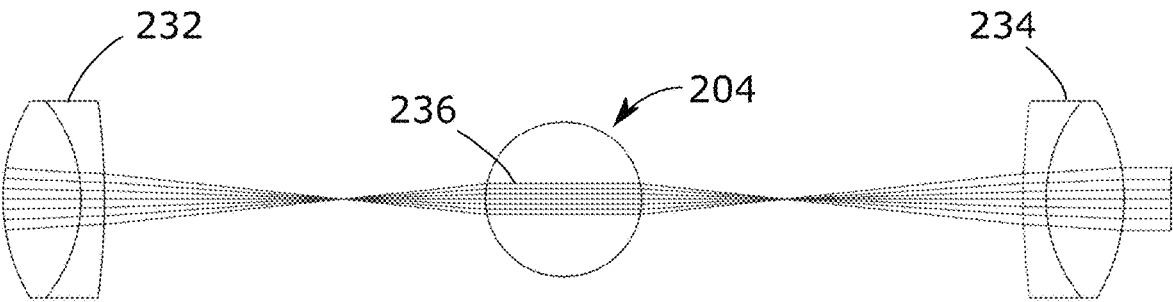

FIG. 16B is a schematic diagram showing simulated beam paths within the system of FIG. 16A.

DETAILED DESCRIPTION

Immaterial modifications may be made to the embodiments described here without departing from what is covered by the claims.

There is provided a tunable bandpass filter and polarizer based on resonant tunneling through an air gap. In an example, the air gap is between two hemi-cylindrical prisms coated with 4-layer a-Si/SiO2 matching stacks. Tuning is achieved by variations in the incidence angle and the air gap thickness, enabling the pass-band center wavelength to be continuously adjusted over a very wide range (~1000-1800 nm in some examples) with approximately fixed fractional bandwidth ($\Delta\lambda/\lambda$~0.5%). An analytical derivation of the incidence angle and air gap thickness required to produce a flat-top TE pass-band at a desired wavelength is provided. An example filter provides excellent out-of-band rejection and strong suppression of the orthogonal TM polarization over the entire tuning range. For applications involving highly collimated light, it could be a useful alternative to existing widely tunable filters based on gratings or liquid crystals.

Figure 1:
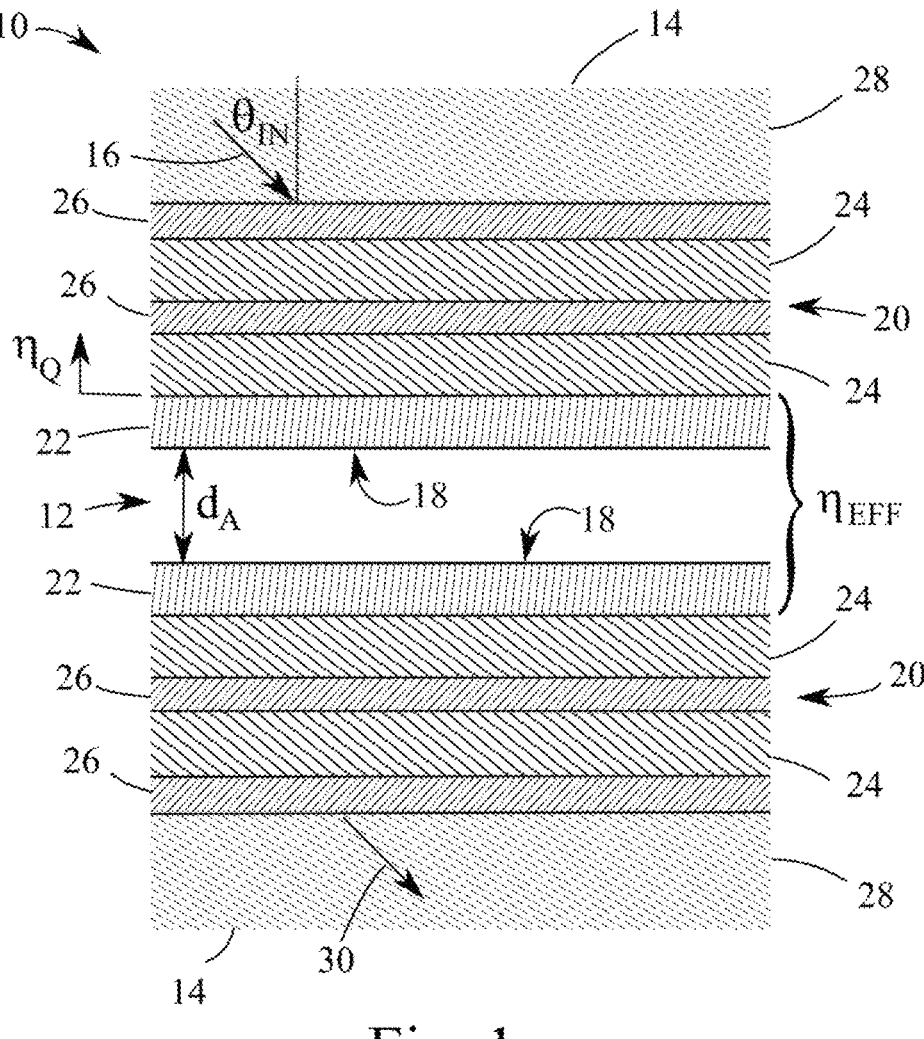
FIG. 1 is a schematic illustration of a tunneling filter.

FIG. 1 is a schematic illustration of a tunneling filter 10. A representative structure comprises an air gap 12 symmetrically bounded by thin-film-stack-coated prisms 14, with light 16 incident at an angle $\theta_{IN}$ subject to total internal reflection at the air interfaces 18. Each prism 14 is coated with a periodic Bragg reflector 20 (2-period case shown) terminated by a 'phase matching' layer 22. The combination of the air gap 12 and the phase matching layers 22 can be replaced by an 'equivalent' layer with effective admittance $\eta_{EFF}$ at a given input angle and wavelength. The Bragg reflector 20 may be formed of alternating layers comprising first layers 24 having a first refractive index $n_L$ and second layers 26 having a second refractive index $n_H$. The phase matching layer 22 has a refractive index $n_{PH}$ which may be equal to $n_L$ or $n_H$. Although the phase matching layer 22 is drawn as if formed from a different material than first layer 24, it may in fact be of the same material and continuous with first layer 24. The prisms may have main volumes 28 with refractive index $n_{IN}$. Light is shown exiting the filter at 30, having tunneled through the airgap.

As discussed in CA 2,960,643 a resonant tunneling pass-band can occur when the equivalent admittance ($\eta_{EFF}$) of the tri-layer mentioned above is made real and equal to the effective admittance 'looking into' the periodic-multilayer-coated prisms (i.e. $\eta_Q$, labeled in the figure). CA 2,960,643 provided a partial analytic theory for achieving such a condition. An admittance matching for TE-polarized light resulted in rejection of TM-polarized light over a broad wavelength range, and vice-versa. This polarizing property conveys a significant advantage over conventional tunneling-based filters, as mentioned above. In the following, we present a more complete theoretical treatment, which furnishes significant additional insight and allows a more rational design of a desired bandpass filter response. In the interest of brevity, we will restrict the discussion to the case of designing a TE-polarized passband; the TM-polarized passband design follows easily.

The symmetric tri-layer comprising the air gap and the phase matching layers can be replaced by an equivalent layer with effective admittance $\eta_{EFF}$, where:

$$\eta_{EFF} = \eta_{PH}\left\{\frac{\sin 2\delta_{PH}\ \cosh\mu_A - B\cdot\cos 2\delta_{PH}\ \sinh\mu_A - A\cdot\sinh\mu_A}{\sin 2\delta_{PH}\ \cosh\mu_A - B\cdot\cos 2\delta_{PH}\ \sinh\mu_A + A\cdot\sinh\mu_A}\right\}^{1/2} \quad (1)$$

Here, $\delta_{PH}=(2\pi/\lambda)\cdot(n_{PH}\cdot d_{PH}\cdot\cos\theta_{PH})$ and $\eta_{PH}=n_{PH}\cos\theta_{PH}$ are the phase thickness and 'tilted' admittance (in free-space units and for TE-polarized light) of each phase-matching layer, $\theta_{PH}$ is the propagation angle, and $n_{PH}$ and $d_{PH}$ are the refractive index and thickness of these layers. For angles that produce tunneling conditions, the air gap layer is equivalent to a lossless metal layer with a purely imaginary tilted admittance, $\eta_A=\cos\theta_A=-i\cdot(n_{IN}^2\sin^2\theta_{IN}-1)^{1/2}$. Following H. A. Macleod, "A new approach to the design of metal-dielectric thin-film optical coatings," Opt.

Acta 25(2), 93-106 (1978), we define $\kappa_A=(n_{IN}^2\sin^2\theta_{IN}-1)^{1/2}$ and $\mu_A=(2\pi/\lambda))\ \kappa_A\cdot d_A$ as the (effective) real admittance and phase thickness of this layer, respectively. Finally, here $A=(\kappa_A/\eta_{PH}+\eta_{PH}/\kappa_A)/2$ and $B=(\kappa_A/\eta_{PH}-\eta_{PH}/\kappa_A)/2$.

Equation (1) allows the effective admittance to be calculated for a given set of (air gap and phase matching) layer thicknesses and input angle. CA 2,960,643 describes how to analytically predict the value of $d_{PH}$ needed to produce a real value of $\eta_{EFF}$ for a given combination of $d_A$ and $\theta_{IN}$. Once $d_{PH}$ is determined accordingly, a matching stack of quarter-wave (i.e. for a given $\theta_{IN}$) high- and low-index layers can be chosen to produce a real $\eta_Q$ as close as possible to the resultant $\eta_{EFF}$, thereby producing a resonant tunneling pass-band. However, this design procedure involves trial-and-error and iteration. For a given input medium (i.e. prism) and input angle $\theta_{IN}$, a more direct synthesis results from first choosing a quarter-wave matching stack (according to certain insights discussed below), which for assumed lossless materials results in an easily calculated and real value of $\eta_Q$. Then, the exercise is to determine combinations of $d_{PH}$ and $d_A$ which result in $\eta_{EFF}=\eta_Q$. Starting from Eq. (1), the following relationship between $\mu_A$ and $\delta_{PH}$ can be derived using an analysis similar to that of C. J. van der Laan and H. J. Frankena, "Equivalent layers: another way to look at them," Appl. Opt. 34(4), 681-687 (1995):

$$\mu_A = \cosh^{-1}\left[\frac{B\cdot\cos 2\delta_{PH} - A\cdot C}{\{A^2\cdot\cos 2 2\delta_{PH} - 2\cdot A\cdot B\cdot C\cdot\cos 2\delta_{PH} + A^2\cdot C^2 - 1\}^{1/2}}\right] \quad (2)$$

Here, $C=(H+H^{-1})/(H-H^{-1})$, where $H=\eta_{EFF}/\eta_{PH}$ and $\eta_{PH}$ is the tilted admittance of the phase matching layers.

Figures 2A, 2B, 2C:
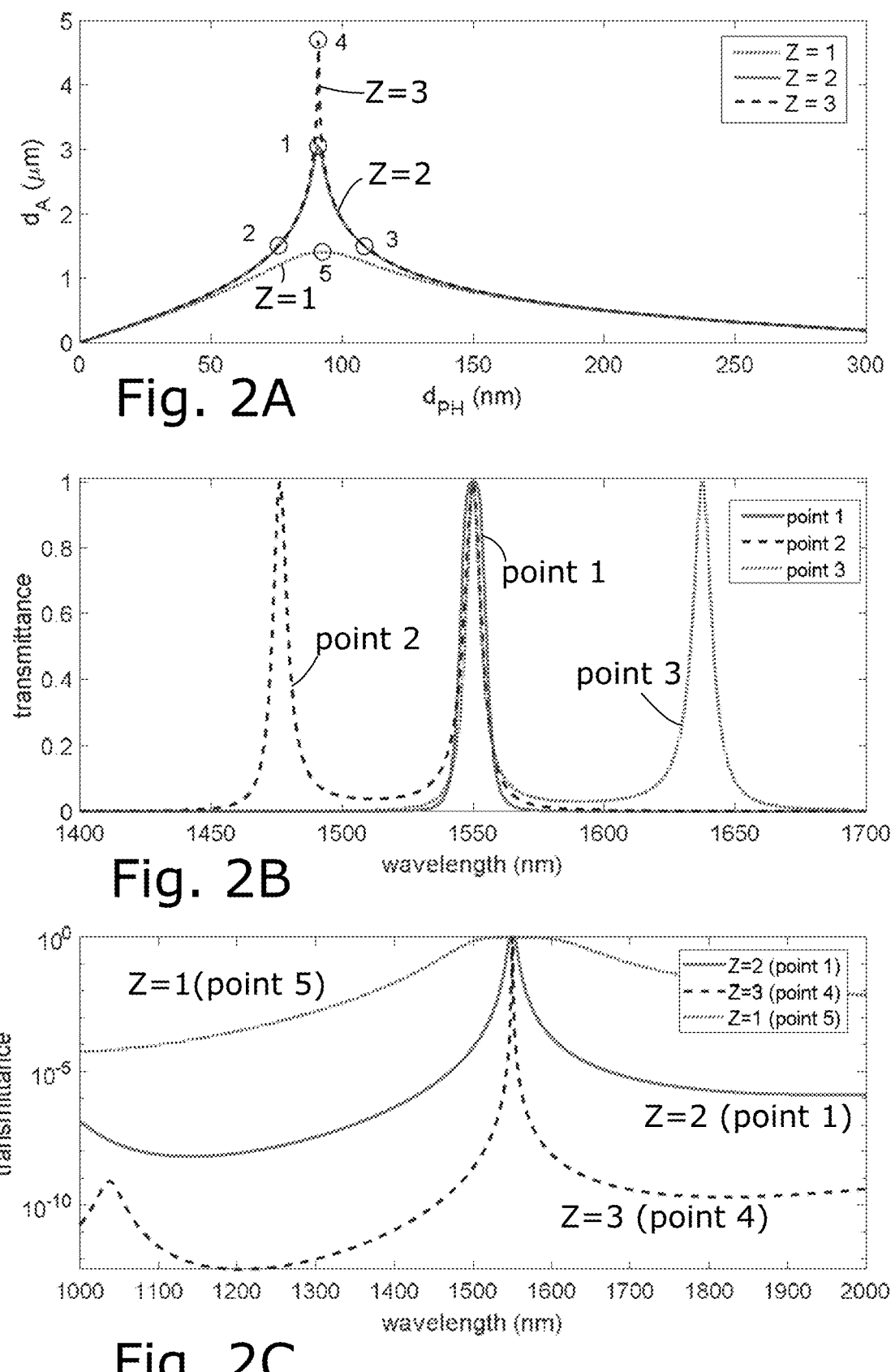
FIG. 2A is a plot of solutions to an equation for layer thicknesses that allow resonant tunneling for at least one wavelength.
FIG. 2B is a plot of transmittance versus wavelength for three selected solutions from FIG. 2A.
FIG. 2C is a plot of transmittance versus wavelength, using log scale, for three selected solutions from FIG. 2A, one of which being a solution also shown in FIG. 2B.

At this point, it is useful to consider a specific example. For comparison to the TE filter of CA 2,960,643, we assume $\lambda=1550$ nm, $n_H=3.7$ (representing a-Si), $n_L=n_{PH}=1.46$ (representing $SiO_2$) and $n_{IN}=1.44$ (representing fused quartz prisms). Furthermore, we assume $\theta_{IN}=48$ degrees, and that the matching stack has the form $(H\cdot L)^Z$, where H and L represent quarter-wave layers ($d_H=109.4$ nm and $d_L=390.2$ nm at this angle), and Z is the number of periods. For such a stack, $\eta_Q=\theta_{IN}\ (\eta_L/\eta_H)^{2\cdot Z}$, resulting in $\eta_Q\ll1$, as necessary to match the typical values of real $\eta_{EFF}$ attainable for the air-gap tunneling layer and TE-polarized light. For TM-polarized light, $\eta_{EFF}\gg1$ is typical, and $(H\cdot L)^Z\cdot H$ matching stacks are thus appropriate. FIG. 2A is a plot of solutions to Eq. (2), in the range $0<\delta_{PH}<\pi/2$, for Z=1 (dotted, lower), 2 (solid, middle), and 3 (dashed, highest peak), corresponding to $\eta_Q=7.6\times10^{-2}$, $6.0\times10^{-3}$, and $4.7\times10^{-4}$, respectively. As is evident, an infinite number of combinations of $d_A$ and $d_{PH}$ can produce the required admittance match in each case. However, note that each curve is peaked, and that the location of the peak (versus $d_{PH}$) is relatively independent of $\eta_Q$ (i.e. of Z).

The shape of the curves in FIG. 2A can be understood from the fact that the physical basis for resonant tunneling is the excitation of coupled surface modes at the air interfaces. In general, these two coupled surface states result in two transmission peaks, associated with a symmetric and an anti-symmetric 'super-mode'. For a given curve, the maximum (e.g. points 1, 4 or 5 labeled in FIG. 2A) corresponds to a critical coupling condition for which the two transmission peaks merge, producing a single flat-top transmission feature. On the left side of this peak (e.g. point 2 labeled in FIG. 2A), every point on the curve represents a combination of $d_A$ and $d_{PH}$ that aligns the symmetric mode (i.e. lower energy) tunneling peak to the design wavelength. On the right side of the peak (e.g. point 3 labeled in FIG. 2A), every point aligns the anti-symmetric mode (i.e. higher energy) tunneling peak to the design wavelength. This behavior is confirmed by the transfer-matrix simulation results shown in FIG. 2B, which are for the Z=2 stacks and for three combinations of $d_A$ and $d_{PH}$ (labeled as points 1,2, and 3 in FIG. 2A) that lie on the admittance-matching curve. Here, the transmittance curve for point 2 is shown as a dashed line, for point 1 is shown as a solid line, and for point 3 is shown as a dotted line.

Thus, the peak of any particular curve of the type shown in FIG. 2A represents a particularly desirable condition for bandpass filtering applications. The location of this peak can be determined analytically by differentiating Eq. (2), leading to a quadratic solution:

$$\cos 2\delta_{PH}^{\#} = \frac{-b + \sqrt{b^2 - 4ac}}{2a}, \tag{3}$$

$$a = 2AB^3C - 2A^3BC \approx -2AB^3 + 2A^3B,$$

$$b = 2A^4C^2 + 2B^2 - 2A^2B^2C^2 \approx 2A^4 + 2B^2 - 2A^2B^2,$$

$$c = -2ABC \approx 2AB.$$

Here $\delta_{PH}^{\#}$ indicates the required phase thickness to achieve a flat-top passband, and the correct sign of the quadratic root was ascertained by checking the solutions against Eq. (1). The approximate forms of the coefficients in Eq. (3) reflect the fact that for TE-polarized light we typically have $\eta_{EFF} \ll 1$ (see example above) and thus C~−1. This furthermore explains the relative insensitivity of the peak location to $\eta_{EFF} = \eta_Q$, as observed in FIG. 2A. Once $\delta_{PH}^{\#}$ is determined, $d_{PH}^{\#}$ follows directly and $d_A^{\#}$ is easily calculated by substitution back into Eq. (2). As an example, for λ=1550 nm, Z=2, and $\theta_{IN}$=48 degrees, and the indices mentioned above, solution of Eqs. (3) and (2) produces $d_{PH}^{\#}$~91 nm and $d_A^{\#}$~3.05 µm, in agreement with the graphical results in FIG. 2A.

As the number of periods in the quarter-wave stacks is increased, the flat-top resonant tunneling passband becomes increasingly narrow. This can be traced to the higher phase dispersion and reflection for increasing Z. The transmittance curves for flat-top passband conditions and Z=1, 2, and 3 (corresponding to points labeled as 5,1, and 4, respectively, in FIG. 2A) are plotted in FIG. 2C. Here, the transmittance curve for point 4, corresponding to Z=3, is the lowest at out-of-band wavelengths and shown using a dashed line; the transmittance curve for point 1, corresponding to Z=2, is intermediate at out-of-band wavelengths and shown using a solid line; and the transmittance curve for point 5, corresponding to Z–1, is highest of the three at out-of-band wavelengths and shown using a dotted line. A flat-top passband condition is confirmed in each case, but with the FWHM dropping from ~140 nm to ~12 nm to ~0.8 nm, and the out-of-band rejection also increasing dramatically with increasing Z. The narrow bandwidth and high out-of-band rejection predicted for the Z=3 case is intriguing, but our numerical simulations indicate that this pass-band could only be observed with extremely well-collimated light and extremely high symmetry in the matching stacks. For example, if the thickness of the two phase matching layers (which is particularly critical) is mis-matched by only ~0.2%, the predicted peak transmission is reduced by approximately half. The observation of such narrow passbands might be impractical for most applications, but not necessarily all, so embodiments with such characteristics are not excluded.

On the other hand, CA 2,960,643, which disclosed an example employing a run-of-the-mill magnetron sputtering system, has already demonstrated the practicality of the Z=2 case. The mis-match can be as high as 2-3% in this case, without significant degradation of the pass-band character-istics. Moreover, the angular sensitivity of the pass-band, while still high, is within a range that is compatible with off-the-shelf collimation optics (see experimental results below). The following discussion will relate to the Z=2 case, but other Z values may be used depending on the applica-tion.

Tuning Through Variation in the Air Gap and the Incidence Angle

In order to achieve a tunable version of the filter described above, one option would be to implement a linearly varied version of the filter, where all layers (including the air gap) are proportionally tapered along one axis. However, this would be a rather challenging structure to fabricate. More-over, linearly varied tunable filters (LVTFs) tend to suffer from slow tuning speeds, due to the need for linear trans-lation of a large part, and passband broadening, due to spatial convolution effects. Angular tuning of thin film filters is an alternative approach, which has been used extensively for narrow-range tuning in fiber systems and more recently for moderate-range tuning in fluorescence and Raman spec-troscopy systems. The latter work uses specialized thin-film filters (with high layer count), which can be tuned over a range equal to ~10% of their normal-incidence passband center wavelength. Angle-tuning is also the mechanism employed in most grating-based tunable filters including the VBG filters discussed above.

Figure 3A:
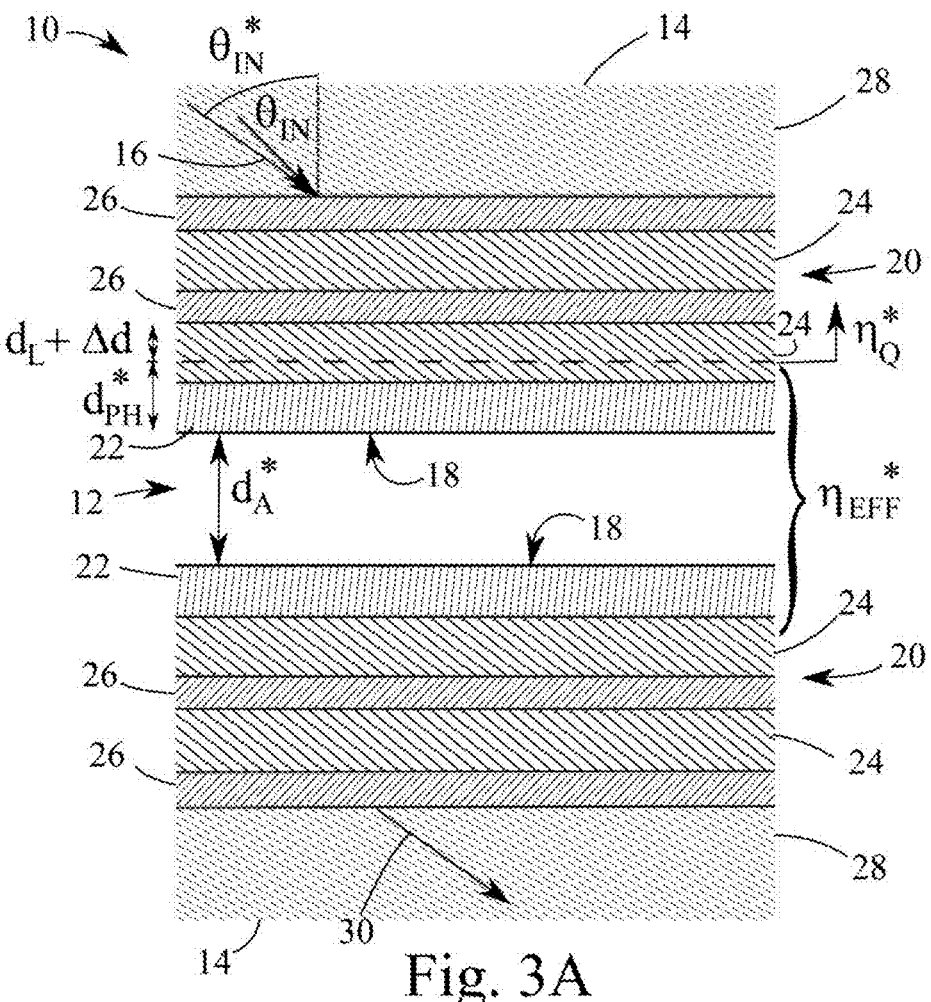
FIG. 3A is a schematic illustration of a tuning method for a tunable filter.
Figure 3B:
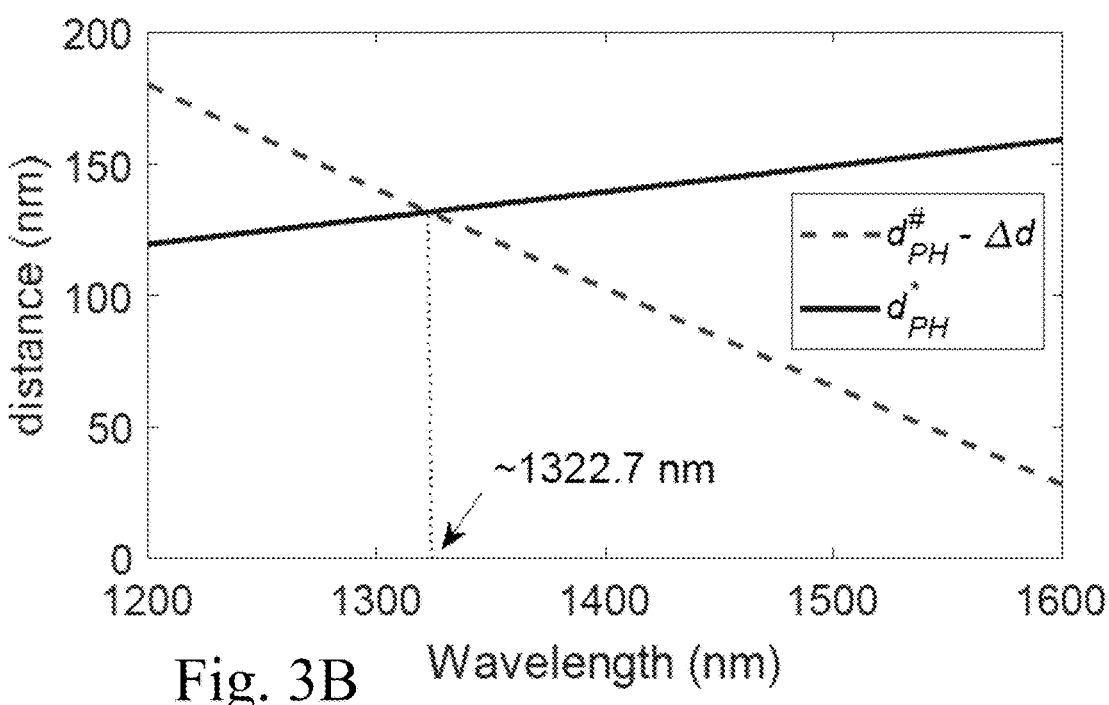
FIG. 3B is a graph showing an example of the determination of the flat-top tunneling wavelength for a particular incidence angle (53 degrees).

FIG. 3A is a schematic illustration of a tuning method for the proposed tunable filter. For a change in incidence angle ($\theta_{in}$ to $\theta_{in}^*$), the effective position of the interface between the phase matching layer and the matching stack shifts by some amount Δd (which can be positive or negative). The flat-top tunneling passband occurs at a new wavelength for which $\eta_Q^*$ and $\eta_{EFF}^*$ are real and equal, and with the air gap thickness $d_A^*$ tuned to an appropriate value. FIG. 3B is a graph showing an example of the determination of the flat-top tunneling wavelength for a particular incidence angle (53 degrees). For each incidence angle there is a single wavelength at which $d_{PH}^* = (d_{PH}^{\#} - \Delta d)$, which in turn makes $\eta_Q^*$ real while also enabling $\eta_{EFF}^* = \eta_Q^*$ through appropri-ate choice of $d_A^*$.

Assume that the prisms are uniformly coated with a thin film stack, designed to provide an admittance-matched tun-neling band at a particular wavelength and incidence angle, as described above. For illustration purposes, we will assume the values cited for the 2-period filter above (i.e. $n_{IN}$=1.44, $n_H$=3.7, $n_L$=$n_{PH}$=1.46, $d_H$=109.4 nm, $d_L$=390.2 nm, and $d_{PH}^{\#}$=91 nm) representing a QWS at $\theta_{IN}$=48 degrees, terminated by a phase adjusting layer chosen to produce a flat-top bandpass response centered at 1550 nm wavelength. Now consider changing the incident angle to some new value $\theta_{IN}^*$. At this new angle, the matching stack (i.e. HLHL) is no longer a QWS, either at 1550 nm or at any other wavelength, and its input admittance is in general complex, $\eta_Q = \eta_Q' - i \cdot \eta_Q''$, as easily calculated for example using transfer matrices. At any given wavelength, a real input admittance can be restored by adding an 'extra' low-index layer of phase thickness:

$$\Delta\delta = 0.5\ \tan^{-1}\left[\frac{2\eta''_Q\eta_L}{\eta_L^2 - (\eta'_Q)^2 - (\eta''_Q)^2}\right], \quad (4)$$

where the tangent should be evaluated in the first or second quadrant. This corresponds to an 'extra' physical thickness of low-index material $\Delta d(\lambda) = (1/2\pi)\cdot\{\Delta\delta(\lambda)/\eta_L\}$, which can be positive or negative. This effectively moves the boundary between the matching stack and the phase matching layers, as depicted in FIG. 3A, such that the effective admittance $\eta_Q^*$ (looking in from the new boundary) is a real quantity. From another point of view, the physical thickness of the phase matching layers is effectively changed from $d_{PH}^\#$ to $(d_{PH}^\# - \Delta d(\lambda))$. As shown in FIG. 3B, $\Delta d(\lambda)$ is a negative quantity at wavelengths much below the original design wavelength and monotonically increases towards positive values at long wavelengths.

Now, at the new input angle and using $\eta_Q^*(\lambda)$ determined above, Eqs. (2) and (3) can be solved to determine the values of phase-matching layers and air gap thicknesses, $d_{PH}^*(\lambda)$ and $d_A^*(\lambda)$, respectively, that are required to produce a flat-top tunneling passband. For a given angle, the spectral location of this passband is thus determined by the following condition:

$$d_{PH}^*(\lambda) = d_{PH}^\# - \Delta d(\lambda). \quad (5)$$

A graphical solution of Eq. (5), for and input angle of 53 degrees, is depicted in FIG. 3B, predicting an admittance-matched tunneling passband at $\lambda\sim$1322.7 nm. Using the resultant value of $d_{PH}^*\sim$132 nm, the required air gap thickness from Eq. (2) is $d_A^*\sim$1.94 μm. To further understand this behavior, recall that the principle requirement for admittance-matched tunneling is that there exist a central tri-layer whose effective admittance $\eta_{EFF}^*$ (at a particular angle and wavelength) is real and matched to the real input admittance $\eta_Q^*$ presented by the adjacent thin-film-coated prisms. This fortuitous situation occurs at a single wavelength for each particular input angle.

By extension, it follows that the spectral position of the flat-top pass-band can be continuously varied over a wide range by simultaneously tuning the air gap thickness and the incidence angle. Plots of the predicted resonant tunneling wavelength, and the corresponding required air gap thickness, are shown in FIGS. 4A and 4B respectively.

Figure 4A:
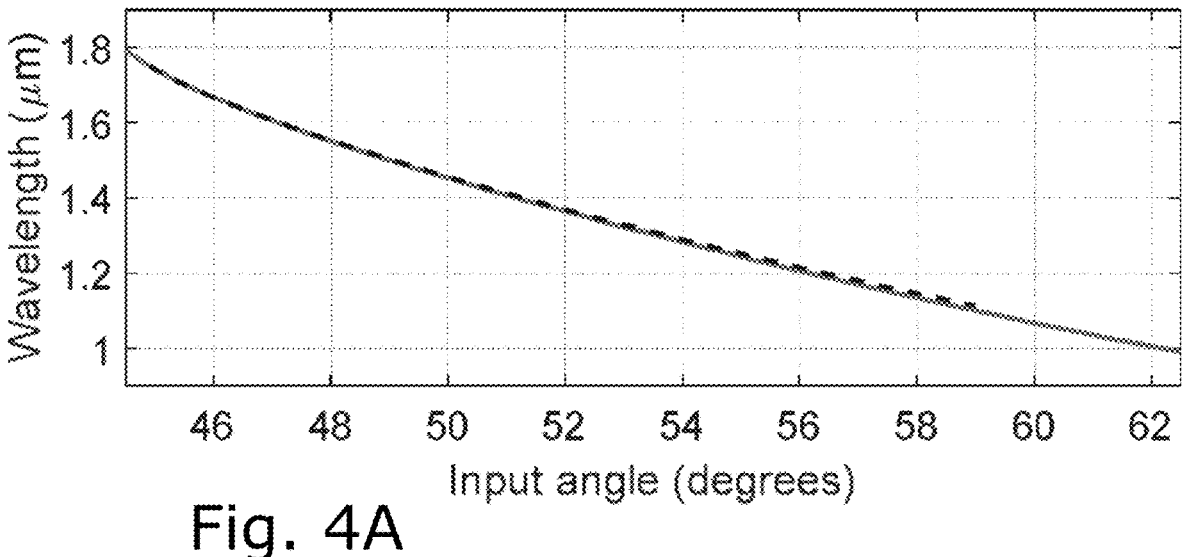
FIG. 4A is a plot showing the predicted flat-top passband wavelength versus input angle, for the filter structure shown in FIGS. 1 and 3A.
Figure 4B:
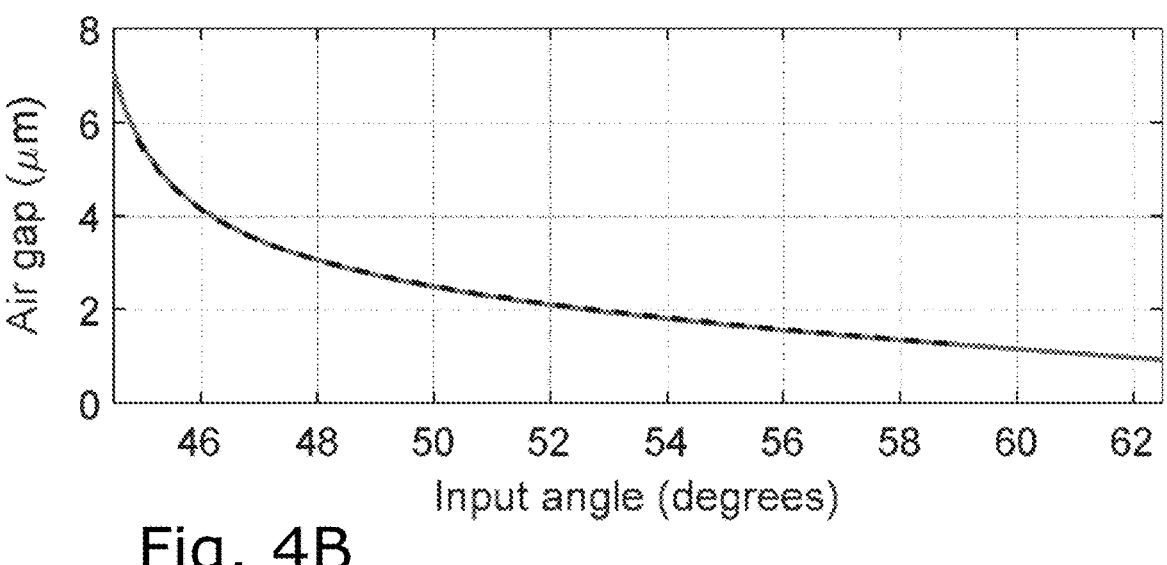
FIG. 4B is a plot showing the predicted air-gap thickness required to produce the flat-top passband, versus input angle.

FIG. 4A is a plot showing the predicted flat-top passband wavelength versus input angle, for the filter structure described above. FIG. 4B is a plot showing the predicted air-gap thickness required to produce the flat-top passband, versus input angle. The solid (dashed) curves were calculated without (with) material dispersion taken into account.

For the matching stacks assumed above, continuous tuning over a wavelength range from ~1000 nm to ~1800 nm is possible through angular tuning in the ~44 to 62 degrees range and corresponding air gap thicknesses in the ~7 to 1 μm range. Results with refractive index dispersion (calculated using models for our sputtered $SiO_2$ and a-Si films) taken into account are also shown. Representative passbands, calculated using transfer matrices, are shown in FIGS. 5A and 5B for selected input angle/air gap combinations.

Figure 5A:
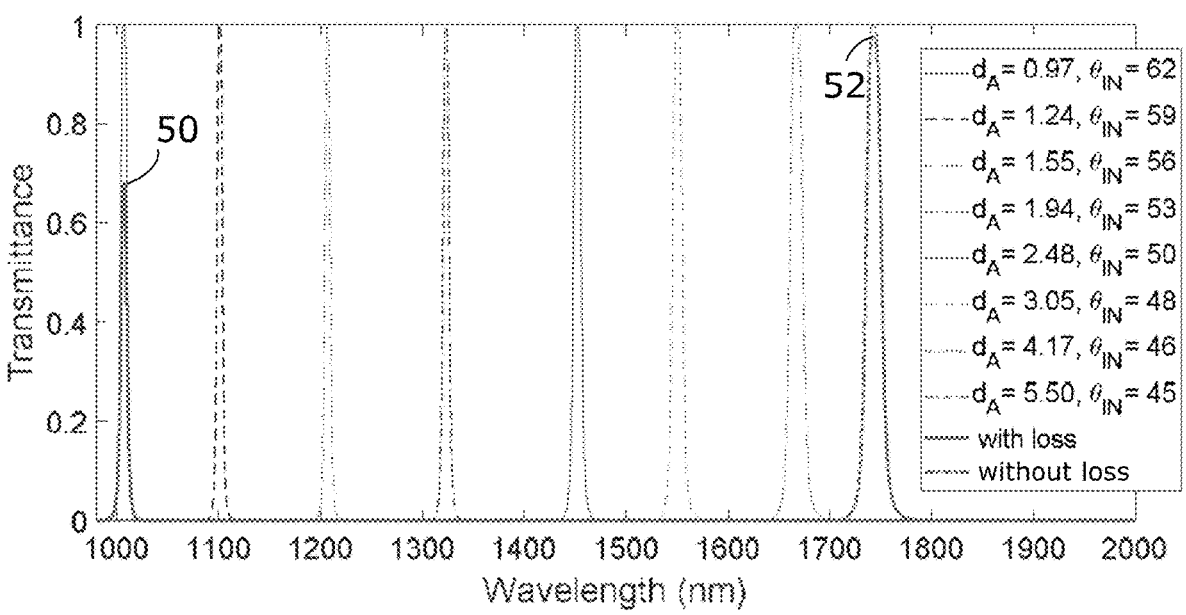
FIG. 5A is a graph showing transmittance versus wavelength for a series of input angle/air gap combinations corresponding to the flat-top passband conditions depicted in FIG. 4.
Figure 5B:
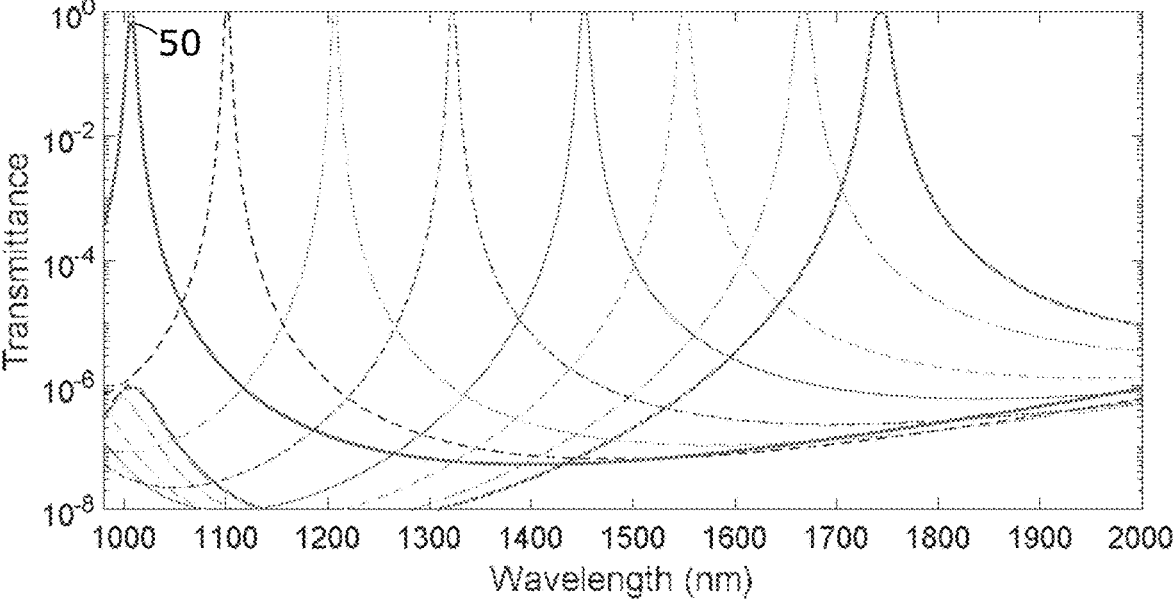
FIG. 5B is a graph showing the data from FIG. 5A with a logarithmic scale for transmittance, in order to reveal the predicted out-of-band rejection.

FIG. 5A is a graph showing transmittance versus wavelength for a series of input angle/air gap combinations corresponding to the flat-top passband conditions depicted in FIG. 4. A flat-top pass-band centered at the predicted wavelength is verified in each case. Each successive passband, as peak wavelength increases, is associated with a successively larger air gap $d_A$ as indicated in the legend. FIG. 5B is a graph showing the data from FIG. 5A with a logarithmic scale for transmittance, in order to reveal the predicted out-of-band rejection.

Of course, unity transmission features are only possible in an idealized scenario neglecting loss and scattering. The impact of including absorption loss for the a-Si layers is shown for the two pass-bands near the opposite ends of the tuning range in FIG. 5A. We used an extinction coefficient model which gives $\kappa_{aSi}\sim$0.006 and ~0.0006 at $\lambda$=1000 nm and 1800 nm, respectively. For the two cases near the end of the tuning range, the bold curves with peaks shown at 50 for the shorter wavelength pass-band and at 52 for the longer wavelength pass-band were calculated with the inclusion of absorptive loss for the a-Si layers. The dashed curves with peaks at unity show the results without absorptive loss, as do the curves for the other wavebands. As shown, the predicted impact on peak transmittance is tolerable, and is consistent with the experimental results disclosed in CA 2,960,643. Moreover, a-Si films have potential for significantly lower loss, for example through optimized hydrogenation.

As mentioned above, the high angular sensitivity of tunneling filters has traditionally been viewed as a major drawback, especially due to the existence of polarization-dependent pass-band splitting. While the polarizing nature of the air gap tunneling filter described above significantly mitigates these issues, the high angular sensitivity of the polarized pass-band still limits the maximum acceptance angle. On the other hand, a high angular sensitivity imparts potential advantages, including the potential for wide tuning range and relatively fast tuning speeds. The representative filter from described above exhibits a shift in passband center wavelength on the order of ~40 nm/degree and pass-band bandwidths on the order of ~10 nm. This implies that the incident light would needs to be collimated with a half-angle less than ~0.5 mrad in order to avoid significant pass-band broadening. This is well within reach using commercial broadband collimators, as supported by the experimental results in CA 2,960,643 and confirmed below. It is also interesting to note that commercial VBG-based tunable filters have similar angular sensitivity and beam divergence restrictions. Finally, it should be noted that angular acceptance can always be limited through optical system design, as needed to avoid passband broadening, at the expense of throughput for sources with higher angular range. Similar tradeoffs are inherent in most diffraction grating instruments.

Experimental Results

Figure 6:
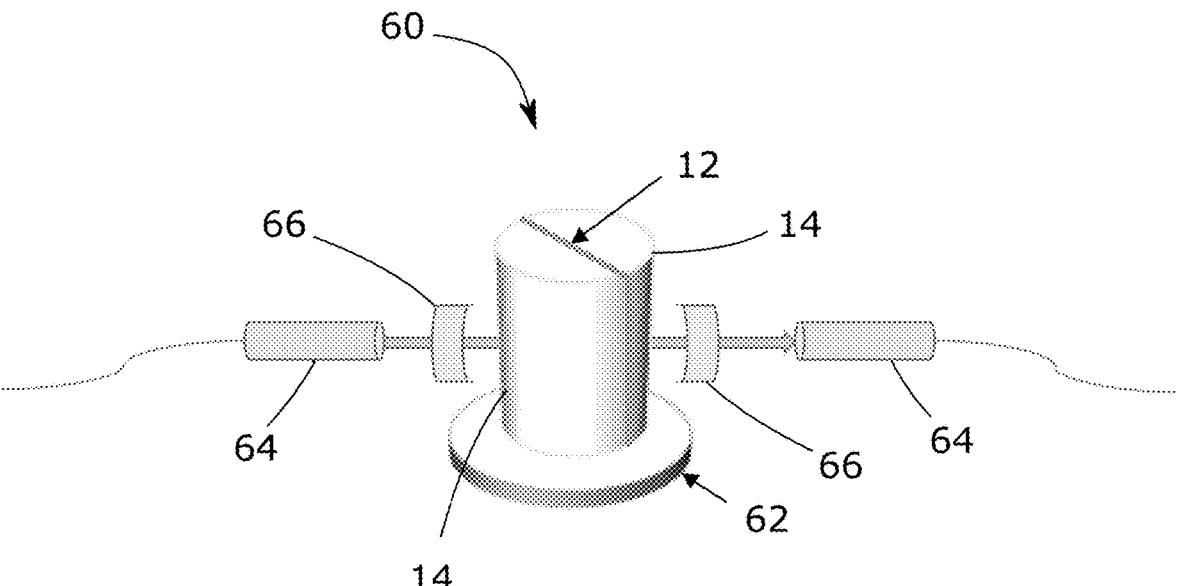
FIG. 6 is a schematic depiction of a tunable filter assembly.

As an initial proof-of-concept, we assembled the system 60 depicted in FIG. 6. FIG. 6 is a schematic depiction of the tunable filter assembly. Tuning is achieved by simultaneously controlling the incidence angle (using a motorized rotational stage 62) and the thickness of the air gap between the matched hemi-cylindrical lenses 14 (using piezo-positioners attached to the lenses, not shown).

The resonant tunneling filter was constructed using nearly hemi-cylindrical lenses (N-BK7 glass, Edmund Optics™) for the coupling prisms 14. First, multiple lenses were mounted in a custom holder to facilitate sputtering deposition of $Si/SiO_2$ matching stacks onto their flat faces. Two-period (i.e. Z=2) stacks with layer thicknesses nominally as described above were deposited. Next, pairs of lenses with well-matched coatings, as verified by ellipsometry measurements, were clamped together, and piezo-electric stack actuators (Thorlabs™ part no. PK2JA2P2, not shown in FIG. 6) were glued at each end of the assembly and to each of the lenses. In the following, we will refer to the piezo-bonded pair of hemi-cylindrical lenses 14 as simply the 'prism assembly'. Assuming the coated lens faces are flat and clamped in intimate contact, the 'resting' value of the air-gap 12 is approximately zero. The chosen piezo-actuators allow this gap to be increased up to a maximum value of ~8 μm.

The prism assembly was subsequently mounted on a rotational stage 62 and aligned between fiber collimators 64 (achromatic fiber ports, Thorlabs™ part no. PAF2-A4C). Note that the use of hemi-cylindrical (or, as discussed below, hemi-spherical) input/output coupling prisms allows the incidence angle to be varied by rotation of the prism assembly, without significant deflection of the beam path for a well-centered system. Diverging cylindrical lenses 66 (Thorlabs™ part no. LK1363L2-C) were positioned between the collimators and the prism assembly, to cancel the focusing effects imparted by the curved surfaces of the prism assembly. The choice of diverging lens focal length and position was optimized through ray-tracing simulations. Light from a broadband source, either a multiple-SLED-based instrument (LuxMux™ BestSled™) or a laser super-continuum source (NKT SuperK™ Compact), was coupled via a single mode fiber (SMF). Light transmitted through the filter assembly was collected into either a SMF or a multi-mode fiber (MMF) and delivered to an optical spectrum analyzer (Yokogawa™ AQ6370B).

The choice of BK-7 coupling prisms in place of the fused silica prisms used in CA 2,960,643 (and assumed for the theoretical treatments above) was primarily motivated by the availability of suitable off-the-shelf lenses. This change has minimal effect on the overall operation of the filter, other than to shift the angular position of the resonant passbands to slightly smaller values (which is actually favorable), in keeping with Snell's law. For example, the 1550 nm flat-top passband predicted at ~48 degrees in FIGS. 4A and 5A for fused silica prisms (n~1.44) instead occurs at ~46 degrees for BK-7 prisms (n~1.5).

FIG. 7A is a graph showing an experimental passband feature centered near 1550 nm wavelength for an incident angle ~46 degrees and various values of the air-gap thickness. Air gap values for several of the curves shown are indicated in the figure. FIG. 7B is a graph showing a similar passband feature as shown for the solid curve ($d_A$~3.10) in FIG. 7A, but on a logarithmic scale.

FIG. 7A shows transmission curves for a typical passband centered near 1550 nm and for several different air gap thicknesses. In keeping with the theoretical predictions, two separate peaks were observed for low values of the air gap thickness, and these peaks merge to produce a single passband feature when the air gap thickness is increased to an appropriate value. FIG. 7B shows a typical flat-top passband, plotted on a logarithmic scale, revealing good agreement between theory and experiment. The out-of-band-rejection is confirmed to be greater than OD5 for wavelengths >100 nm removed from the passband. The actual value is likely higher as indicated by the theoretical curve, but the measurement is currently limited by the dynamic range of our setup.

We subsequently verified that we could tune the passband over a wide range of wavelength by simultaneously adjusting the incidence angle and the air gap thickness.

FIG. 8A is a graph showing experimental passbands centered at various wavelengths in the ~1300-1600 nm wavelength range. FIG. 8B is a graph showing a comparison between theoretical and experimental combinations of air gap thickness (dashed curve and square symbols) and incident angle (solid curve and diamond symbols) required to observe a flat-top passband versus wavelength. The experimental air-gap thicknesses were estimated by fitting the experimental and theoretical results at the long wavelength end and then using the manufacturer-supplied length-voltage curve for the piezo actuators. The theoretical curves are based on the analysis above, but with N-BK7 coupling prisms and a phase matching layer thickness of 88 nm (estimated from ellipsometry measurements) for the results shown.

It is important to note that the operation of the tunable filter is not particularly sensitive to the exact thickness of the thickness of the thin film matching layers, as long as the stacks are well-matched on each side of the air gap. In particular, errors in the phase matching layer thickness simply result in slight changes in the combinations of angle and air gap thickness needed to observe the flat-top passband at a given wavelength. The ability to adjust the tunneling layer thickness during operation thus makes the filter quite robust to variations in the fabrication process.

Embodiment Using Hemi-Cylindrical Lenses

FIG. 9 is an exploded schematic drawing of a prototype tunable filter 100. The filter 'prism assembly' 102 is mounted between fiber collimation ports 104 and attached to a rotational stage 106.

As a proof-of-principle, the prototype system depicted in FIG. 9 was constructed and tested. The prism assembly 102, comprising two hemi-cylindrical lenses 108 joined together via a pair of piezo-actuators 110, was mounted on a custom holder 112 attached to a motorized rotational stage 106.

As mentioned above, diverging cylindrical lenses 114 were positioned between the collimators 104 and the prism assembly 102 at both the input and output sides. These were needed to compensate the focusing effects of the curved surfaces of the cylindrical prism assembly, so that the light incident onto the air gap would be highly collimated. A platform adaptor 116 on the rotation stage 106 mounts kinetic platform 118 which supports the custom prism holder 112. The achromatic fiber ports 104 are mounted to adaptor plates 120. The adaptor plates 120 are linked to a u-bench 122, and to fixed cylindrical mounts 124, using assembly rods 126 extending through or into holes in these elements.

The positions of the various lenses (collimation lenses and diverging cylindrical lenses) were optimized using ray tracing simulations, as shown for example in FIGS. 10A and 10B. FIG. 10A is a top view of a schematic layout showing the results of a ray tracing simulation, and FIG. 10B is a side view of the schematic layout showing the results of the ray tracing simulation. The diverging cylindrical lenses 114 are added to offset the focusing introduced by the curved surfaces of the hemi-cylindrical filter prisms, and in this example have a focal length of –7.7 mm. The filter prisms in FIGS. 10A and 10B are not rotated for drawing purposes.

An artist's conception of the optical system, but omitting the u-bench 122 and an enclosure 130, is shown in FIG. 11A. A rendering of the full device is shown in FIG. 11B.

Embodiment Using Hemi-Spherical 'Half-Ball' Lenses

An alternative approach is to use hemi-spherical ('half-ball') lenses as the input/output coupling prisms. These lenses are widely available and are popular choices for collimation and coupling of beams to and from optical fibers. FIG. 12A is a schematic diagram of a proposed tunable filter 200 based on resonant tunneling through an air gap 202 between two thin-film-stack-terminated half-ball lenses forming a prism assembly 204.

In this case, the 'prism assembly' essentially resembles a spherical (i.e. ball) lens with diameter D, and focal length f which may be approximately equal to D, but with the air gap and phase matching layers bisecting the sphere. In this case, the prism assembly can also play the role of the collimation and focusing element. Light from an input fiber 206 (or input aperture in the case of a free-space coupled system) can be captured and collimated by the input half-ball lens 208, and then refocused to an output fiber 210 (or aperture, or detector) by the output half-ball lens 212. For small variations in the air gap 202, and for a well-centered system, the ball lens prism assembly can be rotated as indicated by arrows 214 without causing significant deviations in the beam path. This can enable an extremely compact, low-cost, and broadband tunable filter based on the resonant tunneling concepts discussed above. In an embodiment, the input fiber is a single mode fiber, and the output fiber is a single mode or multi-mode fiber. The input and output fibers may have a numerical aperture of about 0.13.

Of course, attaching piezo actuators to half-ball lenses introduces additional complications. To address this, we have designed custom holders for these lenses, which will also accommodate precision placement and bonding of the piezo actuators (see FIG. 13A and FIG. 13B).

FIG. 13A is a schematic side view of the prism assembly 204 including piezo actuators 220, 222 and piezo actuator holders 224, 226 for mating and controlling the air gap spacing between two hemi-spherical (half-ball) lenses. Each half-ball lens 208, 212 is first aligned and glued into a custom holder 224, 226, and then the two mounted lenses are joined via piezo actuators 220, 222.

The holders may also include first holes 228, and second holes 230. These holes may be used to align the two sides of the clamp assembly. They may also be threaded so that they enable alignment and clamping pressure to be applied with screws if needed. Whether threaded or not, alignment rods may be placed in these holes to align the holders. In an embodiment, the ball lenses are clamped and glued in place first, and then the piezos are glued onto the assembly later.

FIG. 13B is an end view of the prism assembly 204 of FIG. 13A.

When assembled into a complete unit, the piece shown in FIGS. 13A-B may be mounted on a rotational stage between appropriately positioned optical fibers (or apertures) as depicted in FIG. 12A.

As described above in relation to FIG. 12A, two half-ball lenses may be symmetrically coated by admittance matching stacks, and are configured with a small (μm-scale) air gap between them. From a high-level perspective (i.e. ignoring refraction effects, etc., in the matching stacks and air gap), the lens pair can be expected to function approximately as a single ball lens for transmitted light. A ball lens can function very well as a fiber-to-fiber coupling element. Thus, as depicted, an extremely compact spectrometer unit can be envisioned by appropriate positioning of input and output apertures such that light is collimated inside the ball lens assembly. As detailed above, spectral scanning (i.e. filter tuning) is achieved by simultaneously adjusting the angle of incidence on the air gap ($\theta_{IN}$) and its thickness ($d_A$). FIG. 12B is a schematic diagram showing the assessment of the acceptance angle, for the limiting case with $\theta_{IN}$ near its maximum required value. FIG. 12C is a schematic diagram showing the assessment of the maximum input aperture size, which is determined by the maximum allowed angular spread inside the ball lens assembly, to avoid passband broadening.

A key figure of merit for any spectrometer (or scanning tunable filter) is its light-gathering capability, often quantified by the so-called optical invariant or etendue. The limiting etendue can be expressed as the product of the maximum solid input angle with the area of the maximum allowed input aperture. As depicted in FIG. 12B, the acceptance angle is determined by the projected aperture of the air gap, with the filter ball rotated to the maximum required value of the incident angle $\theta_{IN,MAX}$. As discussed above and further below, typically $\theta_{IN,MAX} \sim 60$ degrees, which corresponds to a limiting numerical aperture (NA)~0.2. Also shown in FIG. 12B is the angular spread corresponding to NA=0.13, which is a typical value for standard single-mode optical fibers. Note that NA=0.2 corresponds to an f/#~2.5, comparable to that of many compact commercial spectrometers.

The maximum input aperture is determined by the need to ensure highly collimated light incident onto the air gap, in order to avoid passband broadening. As depicted in FIG. 12C, and using a small-angle approximation, we can estimate $S_{MAX} \sim (3/2) \cdot D \cdot \alpha_{MAX}$, where $S_{MAX}$ is the maximum diameter of the input aperture, $\alpha_{MAX}$ is the maximum allowable beam angular spread inside the ball lens, and D is the diameter of the ball lens. For the passband design discussed below, we estimate $\alpha_{MAX} \sim 0.001$ rad. Furthermore, we've chosen 10 mm diameter lenses for the experimental work below, resulting in $S_{MAX} \sim 15$ μm, compatible with the use of a standard single mode fiber as the input aperture. Note that this is not dissimilar to typical slit widths of compact diffraction-grating-based spectrometers available commercially, although in those instruments the slit height is typically significantly larger.

Taken together, this results in etendue $\acute{E}=A \cdot \Omega \sim S_{MAX}^2 \cdot \pi^2 \cdot NA^2/4 \sim 2 \times 10^{-5}$ mm²Sr. This is a relatively small value, limited mainly by the input aperture, but nevertheless comparable to many integrated optic and compact commercial spectrometers. In principle, $\acute{E}$ could be increased by using larger ball lenses. However, the use of larger lenses also implies a larger optical system and a need to achieve uniform matching stacks and air gap over a wider area. In any case, the analysis illustrates that the ball lens assembly has potential as a fiber-coupled spectrometer/filter unit.

Experimental Results—Fiber-Coupled Tunable Filter

Prototype ball-lens assemblies were constructed and tested as follows. First, half-ball lenses (Edmund Optics™ 45-937) were placed in a custom substrate holder as described above, and thin-film admittance matching stacks were deposited (by magnetron sputtering) on their flat sides. Two different matching stacks were implemented. For some of the lenses, a 4-layer a-Si/SiO₂ matching stack, nominally identical to the design described in CA 2,960,643, was used to enable tunable operation in the ~1000-1800 nm wavelength range. For a second batch of lenses, an 8-layer Ta₂O₅/SiO₂ matching stack was deposited with alternating Ta₂O₅ and SiO₂ layers of thicknesses ~84/161/84/161/84/161/84/195 nm. This admittance matching stack was designed according to the theory detailed above, to enable a filter that is tunable over the ~400-700 nm wavelength range. FIG. 14 is a graph showing experimental passbands centered at various wavelengths in the wavelength ranges of 460-750 nm, produced by the 8-layer Ta₂O₅/SiO₂ structure mentioned above and measured by a visible range spectrometer (Ocean Optics™ USB4000).

Pairs of coated lenses were then clamped using a custom jig (see FIG. 13A), with their coated faces in nominal contact. The jig is also designed to hold a pair of piezo positioners (in this implementation, Thorlabs™ PK2JA2P2), which are subsequently used to control the thickness of an air gap between the two half-ball lenses. Both the lenses and the piezo stacks were glued in place, such that, after removal of clamping elements, the two sides of the assembly are free to move under the action of the piezos. This ball-lens assembly is then mounted on a motorized rotational stage as described above, so that both the incident angle and air gap are under computer control.

Passband characteristics of both filters were then measured through direct fiber-to-fiber coupling as depicted in FIG. 12A, using polished FC/PC connectorized fibers mounted in standard micro-positioners. For the NIR filter, system throughput was assessed using both single mode (SMF) and multimode (MMF) fibers at the output. For the MMF pickup, the best-case pass-band insertion loss was ~4.5 dB, measured using a polarized broadband source (LUXMUX BeST-SLED®) aligned to launch TE light. The insertion loss for coupling back into a SMF was consistently 3-5 dB higher. Note that neither the fiber end facets nor the curved surfaces of the ball lenses were anti-reflection (AR) coated here. Furthermore, as discussed in more detail below, we believe that the manual assembly procedure resulted in imperfect alignment of the two half-ball lenses. This likely imparts a lateral offset, which would make the overall assembly somewhat aspherical. Furthermore, any unintentional wedge in the air gap thickness is expected to broaden the pass-bandwidth and reduce peak transmission. Based on modeling results, we anticipate that significantly reduced throughput loss can be achieved with the addition of AR coatings and with improvements in alignment. The visible light (VIS) filter was tested with a nominally unpolarized source (NKT SuperK™ Compact), and the best-case insertion loss was ~6 dB for a MMF pickup.

As described above, the NIR filter is tunable over the ~1000-1800 nm wavelength range by varying the incident angle and simultaneously adjusting the air gap. The VIS filter is nominally tunable over the ~400-750 nm range by analogous adjustments of angle and air gap. The full designed range of the NIR device is accessible, with all passbands captured using an optical spectrum analyzer (Yokogawa™ AQ6370B). However, the VIS-range device was limited to wavelengths >460 nm due to a minimum air-gap estimated as 1 μm introduced during manual assembly. Shown in FIG. 14, the passbands of the visible filter were captured using a visible range spectrometer (Ocean Optics™ USB4000). In some cases (particularly for pass-bands with center wavelengths <1100 nm, the width of the aluminum jig used to hold the half-ball lenses impeded proper location of the input and output fibers. This resulted in a non-collimated beam at the air-gap, angular convolution effects, and thus passband broadening. Such effects could be resolved through redesign of the jig.

The shape and out of band rejection characteristics of these passbands can be seen in FIGS. 15A, 15B when plotted on a logarithmic scale. The shape of these passbands agrees very well with theory, however due to dynamic range limitations, the full extent of the out of band rejection cannot be shown. Of particular interest for operation of this filter as a scanning spectrometer, or in a hyper-spectral imaging system, is the change in insertion loss with shifts in passband center wavelength. Such data for the NIR filter is shown in FIG. 15C with the center wavelength adjusted through angle and air-gap tuning. Across the operating range of the filter, insertion loss fluctuated by 4 dB despite no realignment occurring between measurements. Such fluctuation can be partially attributed to imprecision in the location of the filter on the rotational stage, which would result in beam walk off and increased insertion loss away from the wavelength at which the system was aligned.

FIG. 15A is a graph showing typical passband features on a logarithmic scale of the a-Si/SiO2 at ~1610 nm. FIG. 15B is a graph showing typical passband features on a logarithmic scale of the Ta2O5/SiO2 at ~633 nm. In both FIG. 15A and FIG. 15B, theoretical predictions are shown by the dashed curves while measured data is on the solid curves. For the passband shown in FIG. 15A, there is a 44.19° incident angle and 3.43 μm air gap, and for the passband and setup shown in FIG. 15B, there is a 45.48° incident angle and and 1.25 μm air gap. FIG. 15C is a plot showing the change in insertion loss through angle and piezo tuning of the passband center wavelength. Changes are relative to the angle used for alignment which produced a passband at 1279 nm. Output was measured by coupling into a multi-mode fiber.

Hyper-Spectral Imaging System Using the Tunable Ball Lens Filter

Ball lenses have unique imaging capabilities. Like all spherical lenses, they can introduce spherical aberrations. However, their inherent symmetry can eliminate many sources of aberrations and distortion in a properly configured system. Moreover, they can accommodate a wide field of view and form high-resolution images on a centrosymmetric spherical imaging surface, a property which has recently made them central elements in so-called "Gigapixel" imaging systems. In a paraxial system with a flat imaging plane, spherical aberrations can be minimized by limiting the aperture and field angles for light incident on the ball lens.

Our proposed imaging system is depicted in FIG. 16A. The ball-lens tunable filter assembly is symmetrically configured between a pair of longer focal length achromat lenses 232 and 234, forming a 1:1 relay system. This configuration ensures that the bundle of rays passes mainly through the central portion of the ball lens, and that rays from each point in the object space (not shown) are nominally collimated inside the ball lens assembly.

FIG. 16A is a schematic illustration showing the incorporation of the ball lens tunneling filter into an imaging system. The input pupil aperture (P) and supplementary lens focal length (F) are chosen according to a desired aperture at the ball lens, and to limit angular spread of rays inside the ball lens. FIG. 16B is a schematic diagram showing simulated beam paths within the system. The ball lens 204 in FIGS. 16A and 16B may be as described above in relation to FIGS. 12A-13C, with input half-ball lens 208 and output half-ball lens 212 separated by airgap 202 as shown in FIG. 16A. The imaging system also includes an input lens 232 and output lens 234.

Each point in the object plane will produce a bundle of collimated rays 236 that passes through the tunneling filter air gap at a unique angle. Given the angular dependence of the passband here, this furthermore implies that the pass-band center wavelength will vary radially within the field of view for a given filter setting. In other words, concentric 'rainbow' bands of color would be viewed on the image plane. This type of spectral passband variation over the field of view is a common feature of many other tunable filters used for hyperspectral imaging, including Fabry-Perot filters and volume Bragg grating filters. It can be compensated by scanning the calibrated filter over some range of wavelengths around the desired wavelength, and then performing a software correction to produce an image that is centered at a single common wavelength over the entire field of view in the image plane.

The above system has been implemented in an imaging system for testing. This example system uses cemented doublet achromat lenses with appropriate antireflection coatings (Thorlabs™ AC127-019-A for the VIS filter, and Thorlabs™ AC127-019-C for the NIR filter) and long focal lengths relative to the ball lens assembly. Simulations using Zemax™ such as shown in FIG. 16B were used to estimate the appropriate placement of the achromat lenses to produce both a nominally collimated beam in the center of the ball lens and at the output. Then, the lens relay system was aligned by use of fiber collimators at input and output, with the typical peak insertion loss estimated at ~3 dB for TE polarized input light. The collimators were then replaced with an infinity corrected microscope objective at the input and a camera with a TV-lens focused at infinity at the output. A silicon consumer grade camera (Thorlabs™ DCC 1645-C or DCC 1545-M) was used in the VIS-range test imaging system.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method for tuning a resonant tunneling optical filter operating in a frustrated total internal reflection regime, the method comprising:

providing a resonant tunneling optical filter comprising two hemi-cylindrical or hemi-spherical coupling prisms each having a flat surface coated with a uniform thin film stack specified to enable admittance-matched resonant tunnelling of a selected linear polarization state and wavelength of incident light while reflecting an orthogonal linear polarization of incident light over a wavelength range of interest, the coupling prims having their coated surfaces separated by a tunneling gap of adjustable width and having gap interfaces subject to total internal reflection, the resonant tunneling being mediated by surface states at the interfaces of the tunneling gap;

adjusting an angle of incidence of light onto the resonant tunneling optical filter to cause a variation in resonant energy and frequency of the surface states;

adjusting a width of the tunneling gap of the resonant tunneling optical filter to cause a variation in mutual coupling between the surface states; and the angle of incidence and the width of the tunneling gap being adjusted in combination wherein the angle of incidence is selected to provide a desired center wavelength and the tunneling gap is selected to provide a desired shape of a passband of the resonant tunneling optical filter.

2. The method of claim 1 in which the desired shape is a flat top shape.

3. The method of claim 1 in which the angle of incidence is adjusted by rotating the resonant tunneling optical filter relative to a collimated light source.

4. A resonant tunneling optical filter operating in a frustrated total internal reflection regime and comprising two hemi-cylindrical or hemi-spherical lenses as input/output coupling prisms, each lens having a respective flat face facing the flat face of the other lens, in which the respective flat faces are each coated with respective thin film stacks, the flat faces being separated in use by an air gap with interfaces subject to total internal reflection, the thin film stacks arranged to provide resonant tunneling across the air gap, the resonant tunneling being mediated by surface states at the interfaces of the air gap, and the air gap being adjustable in thickness, in which adjusting the thickness of the air gap causes a variation in mutual coupling between the surface states, and a center wavelength and shape of a resonant tunneling passband being adjustable by combined adjustments of the air gap thickness and the angular orientation of the air gap relative to a collimated light beam inside the coupling prisms;

wherein adjusting the angular orientation of the air gap relative to the collimated light beam causes a variation in resonant energy and frequency of the surface states.

5. The resonant tunneling optical filter of claim 4 in which the thin film stacks are spatially uniform.

6. The resonant tunneling optical filter of claim 4 in which the thin film stacks are substantially identical.

7. The resonant tunneling optical filter of claim 4 in which the thin film stacks are configured for admittance matching to TE-polarized light.

8. The resonant tunneling optical filter of claim 4 in which the thin film stacks are configured for admittance matching to TM-polarized light.

9. The resonant tunneling optical filter of claim 4 mounted on a stage for rotation around an axis.

10. The resonant tunneling optical filter of claim 4 in which the lenses are arranged to provide focusing and/or collimation to a beam of light directed towards the resonant tunneling optical filter.

11. An optical assembly comprising the resonant tunneling optical filter of claim 4 in combination with additional optics arranged to direct collimated light to the resonant tunneling optical filter.

12. The optical assembly of claim 11 in which the additional optics comprise supplementary lenses.

13. An imaging system comprising a resonant tunneling optical filter as claimed in claim 4 wherein the resonant tunneling optical filter comprises hemi-spherical lenses and an input lens arranged to direct rays of an incoming image to enter the hemi-spherical lenses and to be substantially collimated within the hemi-spherical lenses.

14. The imaging system of claim 13 further comprising an output lens arranged to form an image from light received from the resonant tunneling optical filter.

* * * * *